US011999036B2

(12) United States Patent
Jiang et al.

(10) Patent No.: US 11,999,036 B2
(45) Date of Patent: Jun. 4, 2024

(54) POWER TOOL SYSTEM AND TOOL ATTACHMENT DEVICE

(71) Applicant: Nanjing Chervon Industry Co., Ltd., Nanjing (CN)

(72) Inventors: Jie Jiang, Nanjing (CN); Corey Berman, Nanjing (CN); Ran Lan, Nanjing (CN); Bun Hiong Chua, Nanjing (CN); Matthew Rybka, Nanjing (CN); Junjie Ye, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 444 days.

(21) Appl. No.: 17/363,589

(22) Filed: Jun. 30, 2021

(65) Prior Publication Data

US 2021/0402581 A1 Dec. 30, 2021

(30) Foreign Application Priority Data

Jun. 30, 2020 (CN) ......................... 202010615001.2
Dec. 8, 2020 (CN) ......................... 202011420990.6

(51) Int. Cl.
*B25B 23/04* (2006.01)
*B25C 1/00* (2006.01)
*B25C 1/06* (2006.01)
*B25C 7/00* (2006.01)

(52) U.S. Cl.
CPC ................ *B25C 7/00* (2013.01); *B25B 23/04* (2013.01); *B25C 1/001* (2013.01); *B25C 1/06* (2013.01)

(58) Field of Classification Search
CPC .. B25C 7/00; B25C 1/06; B25C 1/001; B25C 1/002; B25C 1/003; B25F 3/00; B25F 5/00; B25F 5/02; B25B 21/00; B25B 23/02; B25B 23/04; B25B 23/045; B25B 23/06; B25B 23/84; B25B 23/10; B25G 1/00
See application file for complete search history.

(56) References Cited

U.S. PATENT DOCUMENTS

| | | | | |
|---|---|---|---|---|
| 8,322,457 | B2 * | 12/2012 | Mok | B23B 31/1238 173/90 |
| 8,677,868 | B2 * | 3/2014 | Hoffman | B25B 23/04 81/57.3 |
| 8,726,765 | B2 * | 5/2014 | Hoffman | B25B 23/045 81/57.37 |
| 9,616,557 | B2 * | 4/2017 | Hays | B25B 23/0064 |
| 2011/0008117 | A1 * | 1/2011 | Kasuya | B25D 17/088 408/67 |
| 2019/0168363 | A1 * | 6/2019 | Ishizaki | B25B 23/045 |

* cited by examiner

*Primary Examiner* — Robert J Scruggs
(74) *Attorney, Agent, or Firm* — Greenberg Traurig, LLP

(57) ABSTRACT

A tool attachment device for assisting a power tool in performing nailing includes a shell assembly, a rocker, a connection device, a driving wheel, and a transmission assembly. A side of the shell assembly is formed with a hole passage. The rocker is partially placed in the hole passage and is rotatable in the hole passage. The connection device is connected to the rocker and rotates synchronously with the rocker. Nail feeding structures are formed on the driving wheel along a circumferential direction of the driving wheel. The transmission assembly is connected to the driving wheel and the connection device and is configured to drive the driving wheel to rotate unidirectionally. The transmission assembly is disposed between the connection device and the driving wheel.

19 Claims, 19 Drawing Sheets

POWER TOOL SYSTEM AND TOOL ATTACHMENT DEVICE

RELATED APPLICATION INFORMATION

This application claims the benefit under 35 U.S.C. § 119(a) of Chinese Patent Application No. CN 202010615001.2, filed on Jun. 30, 2020, and Chinese Patent Application No. CN 202011420990.6, filed on Dec. 8, 2020, the disclosures of which are incorporated by reference in their entirety herein.

BACKGROUND

An output tool that provides a rotational output force, such as a screwdriver and a hammer drill, can be used to assist in performing nailing. However, a user holds a screw for replacement, which reduces the working efficiency and makes the user vulnerable. A tool attachment device for assisting a power tool in performing nailing exists and can feed nails to the power tool, which is convenient for a user to operate. In order to implement the auxiliary nail feeding by the tool attachment device, a structure of the tool attachment device is typically complex. A relatively large size is not conducive to the improvement of portability, thus increasing the using burden of the user.

SUMMARY

In one aspect of the disclosure, a tool attachment device for assisting a power tool in performing nailing is provided. The tool attachment device includes: a shell assembly, wherein a side of the shell assembly is formed with a hole passage; a rocker partially placed in the hole passage and rotatable in the hole passage; a connection device, wherein the connection device is connected to the rocker and rotates synchronously with the rocker; a driving wheel, wherein nail feeding structures are formed on the driving wheel along a circumferential direction of the driving wheel; and a transmission assembly connected to the driving wheel and the connection device and configured to drive the driving wheel to rotate unidirectionally. The transmission assembly is disposed between the connection device and the driving wheel.

In one example, the connection device includes a rotatable disk and a first engagement portion disposed on a side of the rotatable disk, and the first engagement portion is connected to the transmission assembly in a unidirectional stop-rotation manner.

In one example, the transmission assembly includes a first ratchet wheel, a second ratchet wheel, and a central shaft, the first ratchet wheel includes a first ratchet and a first shaft hole, the second ratchet wheel includes a second ratchet and a second shaft hole, and the central shaft passes through the first shaft hole and/or the second shaft hole.

In one example, a plurality of first ratchets are disposed on a side of the first ratchet wheel and surround the first shaft hole, the first ratchet is formed with a step slope and a stop surface, and the first engagement portion is formed at a first stop-rotation ratchet disposed opposite to the first ratchet.

In one example, the transmission assembly further includes an elastic element, and the elastic element is disposed between the first ratchet wheel and the second ratchet wheel.

In one example, the driving wheel includes a drum formed with an accommodating cavity and a wheel disk fixedly connected to the drum, the transmission assembly is placed in the accommodating cavity, the drum includes a first connection portion, the transmission assembly is formed with a second connection portion, the drum is connected to the transmission assembly through the first connection portion and the second connection portion, the nail feeding structures are uniformly distributed on the wheel disk along a circumferential direction of the wheel disk, the shell assembly further includes a second engagement portion formed with a second stop-rotation ratchet disposed opposite to the second ratchet.

In one example, the driving wheel is fixedly connected to the central shaft, the central shaft is rotatably connected to the first ratchet wheel in a synchronous manner, the driving wheel includes a second engagement portion, and the second engagement portion is formed with a second stop-rotation ratchet disposed opposite to the second ratchet.

In one example, a side of the rotatable disk is formed with a mounting groove, the first engagement portion constitutes a side wall of the mounting groove, the transmission assembly includes an elastic element, and the elastic element is disposed in the mounting groove and unidirectionally rotatable in the mounting groove.

In one example, the transmission assembly includes a central shaft, the central shaft is fixedly connected to the elastic element, the elastic element is formed with at least two extension arms, the first engagement portion is configured to limit the at least two extension arms to rotate merely unidirectionally in the mounting groove.

In one example, the shell assembly includes a main shell, a nail feeding shell capable of moving back and forth relative to the main shell in a nail feeding direction, and a guide structure formed in the nail feeding shell, and the tool attachment device further includes an extension rod configured to pass through the guide structure to drive a screw to rotate.

In one example, a number of driving wheels is one.

In one example, the tool attachment device further includes a mounting device, wherein the mounting device is disposed in the shell assembly and configured to be connected to a front end of the power tool, the mounting device includes a stop-rotation connection portion connected to the power tool in a stop-rotation manner, a sliding groove disposed in the mounting device and provided with an opening on a surface of the mounting device, and a positioning device, the positioning device includes an elastic piece and a stop piece disposed in the sliding groove and abutting against the elastic piece, the shell assembly includes a plurality of limiting grooves, and the stop piece is capable of being limited between the sliding groove and the limiting groove by the elastic piece.

In one example, the tool attachment device further includes a connection hole disposed in the mounting device and penetrating through the mounting device; a roll ball disposed in the connection hole; and a switching device including a locking state and an unlocking state. The switching device is configured to limit the roll ball in a first position where the roll ball is capable of being connected to a power tool system and the power tool when the switching device is in the locking state, and the switching device is configured to allow the roll ball to move between a second position and the first position within the connection hole when the switching device is in the unlocking state.

In another aspect, a power tool system is provided. The power tool system includes: a power tool including an output portion rotatable about a first axis; and a tool attachment device. The tool attachment device includes: a shell assembly, wherein a side of the shell assembly is formed with a hole passage; a rocker partially placed in the hole passage and rotatable in the hole passage; a connection device, wherein the connection device is connected to the rocker and rotates synchronously with the rocker; a driving wheel, wherein nail feeding structures are formed on the driving wheel along a circumferential direction of the driving wheel, and a number of driving wheels is one; and a transmission assembly connected to the driving wheel and the connection device and configured to drive the driving wheel to rotate unidirectionally. The transmission assembly is disposed between the connection device and the driving wheel.

In one example, the tool attachment device further includes a mounting device disposed in the shell assembly and configured to be connected to a front end of the power tool, a limiting ring disposed on a front end of the mounting device along a circumferential direction, and a stop piece abutting against the limiting ring, the front end of the power tool is formed with a fitting portion connected to the tool attachment device, the mounting device includes at least two mounting holes, the stop piece is placed in the at least two mounting holes and biased by the limiting ring such that the stop piece clamps the fitting portion to enable the power tool to be rotatable relative to the tool attachment device and fixed to at least two positions.

In one example, an inner periphery of the mounting device is provided with a groove, the front end of the power tool is formed with a convex rib, and the convex rib is configured to be placed into the groove along the first axis.

In one example, the limiting ring is an elastic piece, the limiting ring is configured to bias the stop piece to a locking position such that the stop piece prevents rotation of the convex rib in a certain direction relative to the tool attachment device in response to the power tool being connected to the mounting device, the stop piece is a ball, and the convex rib is configured to press the stop piece to disengage the stop piece from the locking position.

In one example, the connection device includes a rotatable disk and a first engagement portion disposed on a side of the rotatable disk, and the first engagement portion is connected to the transmission assembly in a unidirectional stop-rotation manner.

In one example, the transmission assembly includes a first ratchet wheel, a second ratchet wheel, and a central shaft, the first ratchet wheel includes a first ratchet and a first shaft hole, the second ratchet wheel includes a second ratchet and a second shaft hole, and the central shaft passes through the first shaft hole and/or the second shaft hole.

In one example, the tool attachment device further includes a mounting device disposed in the shell assembly and configured to be connected to a front end of the power tool and a dust exhaust device that prevents dust generated due to operation of the power tool system from entering between the mounting device and the shell assembly, the mounting device is capable of rotating to at least two positions about the first axis relative to the shell assembly, and the dust exhaust device is disposed between the mounting device and the nail feeding structure.

DETAILED DESCRIPTION

Figure 1:
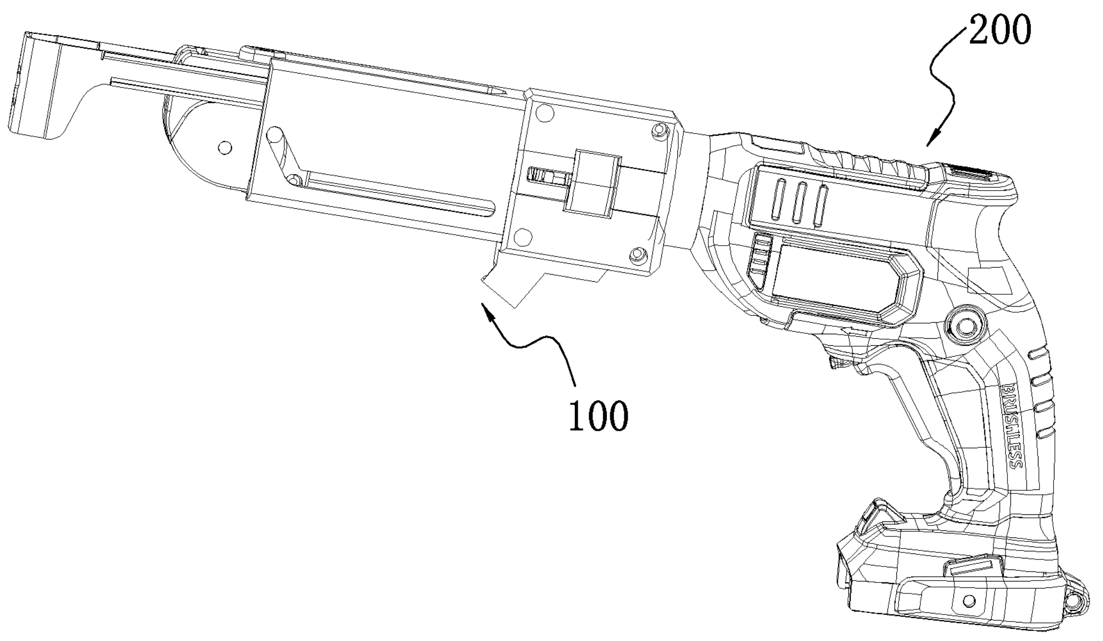
FIG. 1 is a perspective view of a tool attachment device mounted to a power tool according to an example of the present disclosure.
Figure 2:
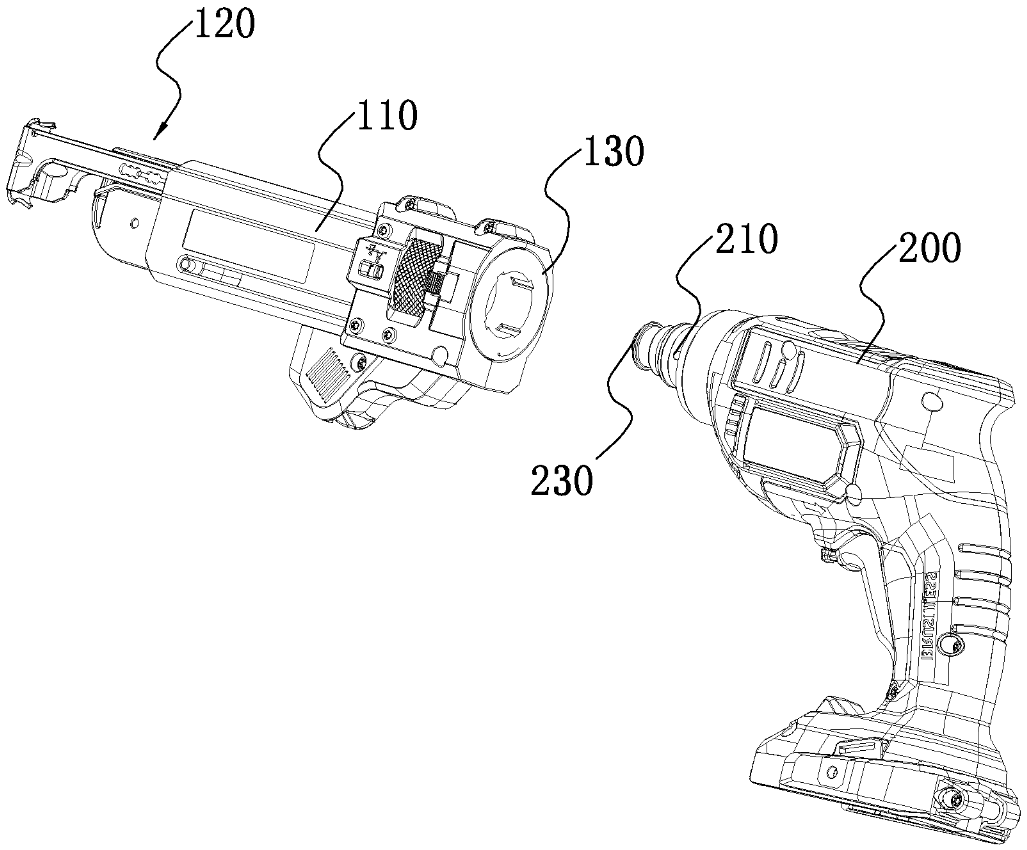
FIG. 2 is a schematic view of a power tool system of FIG. 1 according to the present disclosure.

Referring to FIGS. 1 and 2, the present disclosure provides a power tool system. The power tool system includes a power tool and a tool attachment device. A tool attachment device 100 is configured to assist a power tool 200 in performing nailing and can feed nails to the power tool 200, which is convenient for a user to operate. The power tool 200 is an output tool capable of providing a rotational output force, such as a screwdriver and a hammer drill. The power tool 200 includes an output portion 230 which is driven by a motor to rotate. The output portion 230 is rotatable about a first axis 101 and can drive a workpiece to rotate. The tool attachment device 100 is detachably connected to a front end of the power tool 200 to implement nail feeding to the power tool 200.

Figure 3:
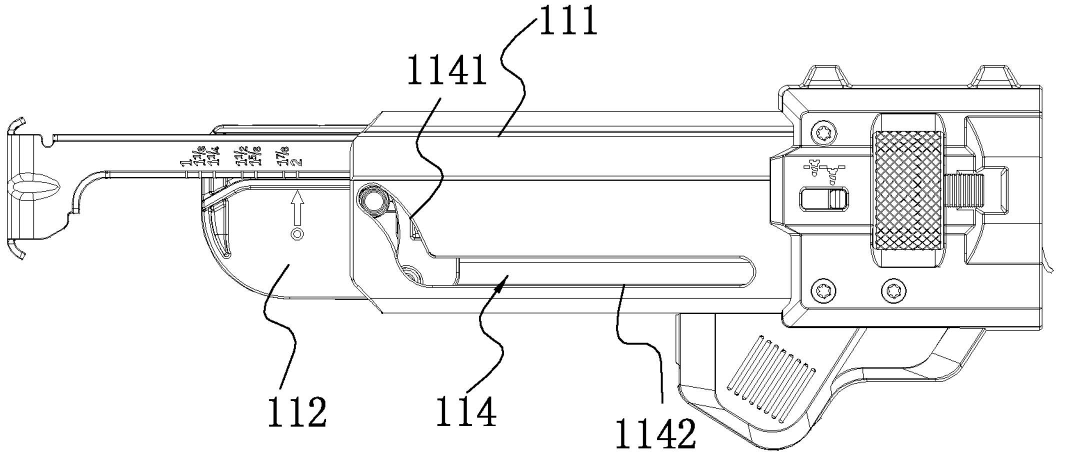
FIG. 3 is a planar view of the tool attachment device of FIG. 1 according to the present disclosure.
Figure 4:
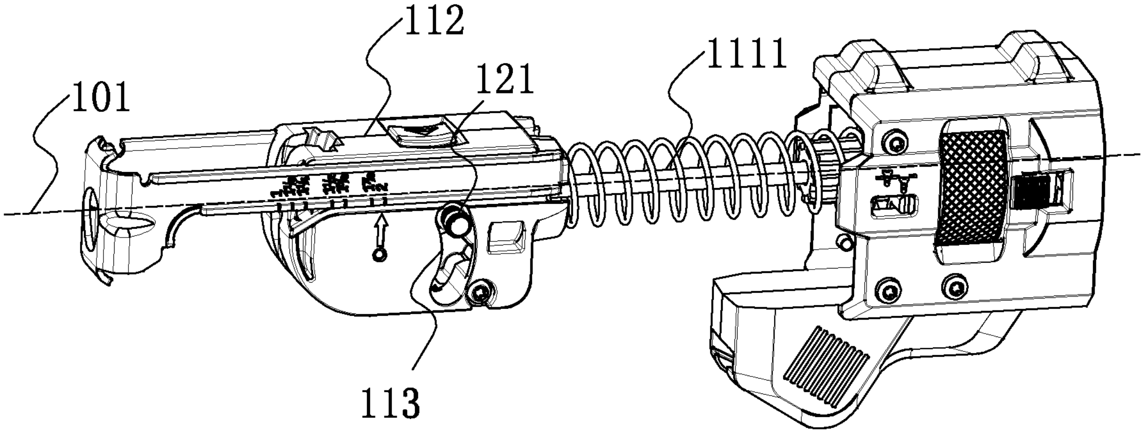
FIG. 4 is an interior view of the tool attachment device of FIG. 1 according to the present disclosure.

Referring to FIGS. 3 and 4, the tool attachment device 100 includes a shell assembly 110, a nail feeding assembly 120 and a mounting device 130, and the nail feeding assembly 120 is supported by the shell assembly 110 and capable of feeding screws along a direction of the first axis 101. The mounting device 130 is disposed in the shell assembly 110 and configured to be connected to the front end of the power tool 200. The shell assembly 110 includes a main shell 111 and a nail feeding shell 112. The main shell 111 is slidably connected to the nail feeding shell 112, and the nail feeding assembly 120 is disposed in the nail feeding shell 112 and supported by the nail feeding assembly 120. The nail feeding shell 112 can move back and forth in a nail feeding direction relative to the main shell 111. Optionally, the nail feeding shell 112 is of a two-half structure, and after the two halves are spliced, an interior of the nail feeding shell 112 forms a space for accommodating the nail feeding assembly 120, thereby facilitating assembly.

Referring to FIG. 4, an extension rod 1111 is disposed in the main shell 111, a tail end of the extension rod 1111 is configured to be supported by a rear end of the shell assembly 110, and the extension rod 1111 is rotatably connected to the main shell 111. The tail end of the extension rod 1111 is formed with a connection structure that is connected to a cutter head in a stop-rotation manner. After the power tool 200 is connected to the tool attachment device 100, the output portion 230 is placed into the connection structure at the rear end of the extension rod 1111 so that the power tool 200 can drive the extension rod 1111 to rotate. A front end of the extension rod 1111 is configured to be similar to the cutter head in structure so that the extension rod 1111 can drive a screw to rotate to implement the nailing function.

Referring to FIGS. 3 and 4, a side of the nail feeding shell 112 is formed with a hole passage 113, and the hole passage 113 is formed in a certain arc. The nail feeding assembly 120 includes a rocker 12, the rocker 121 is partially placed in the hole passage 113 and is slidable in the hole passage 113. A side of the main shell 111 is formed with a guide rail 114. The guide rail 114 includes an inclined guide rail 1141 and a horizontal guide rail 1142. The inclined guide rail 1141 communicates with the horizontal guide rail 1142, and the horizontal guide rail 1142 is configured to be parallel to the first axis 101 where the nail feeding direction is located. The rocker 121 is placed in the hole passage 113 and the guide rail 114 simultaneously. The rocker 121 is slidable between an initial position and an end position in the hole passage 113. When the rocker 121 is located in the initial position in the hole passage 113, the rocker 121 is simultaneously located at the inclined guide rail 1141 of the guide rail 114, and a size of the inclined guide rail 1141 and a size of the hole passage 113 are correspondingly configured. When a user operates the tool attachment device 100 to move toward a workpiece, the nail feeding shell 112 slides relative to the main shell 111 so that the nail feeding shell 112 approaches the rear end of the main shell 111 and the rocker 121 is pushed by the inclined guide rail 1141 to slide within the hole passage 113 from the initial position to the end position. When the rocker 121 is at the end position of the hole passage 113, the rocker 121 simultaneously enters the linear track. As the nail feeding shell 112 continues to slide relative to the main shell 111, the rocker 121 slides in the horizontal guide rail 1142 while being located at the end position of the hole passage 113.

Figure 6:
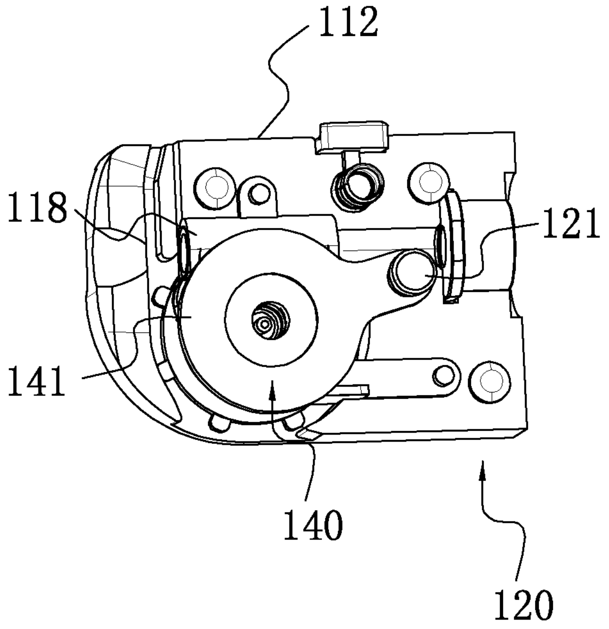
FIG. 6 is a schematic view of an internal structure of a nail feeding assembly of the tool attachment device of FIG. 1 according to the present disclosure.
Figure 7:
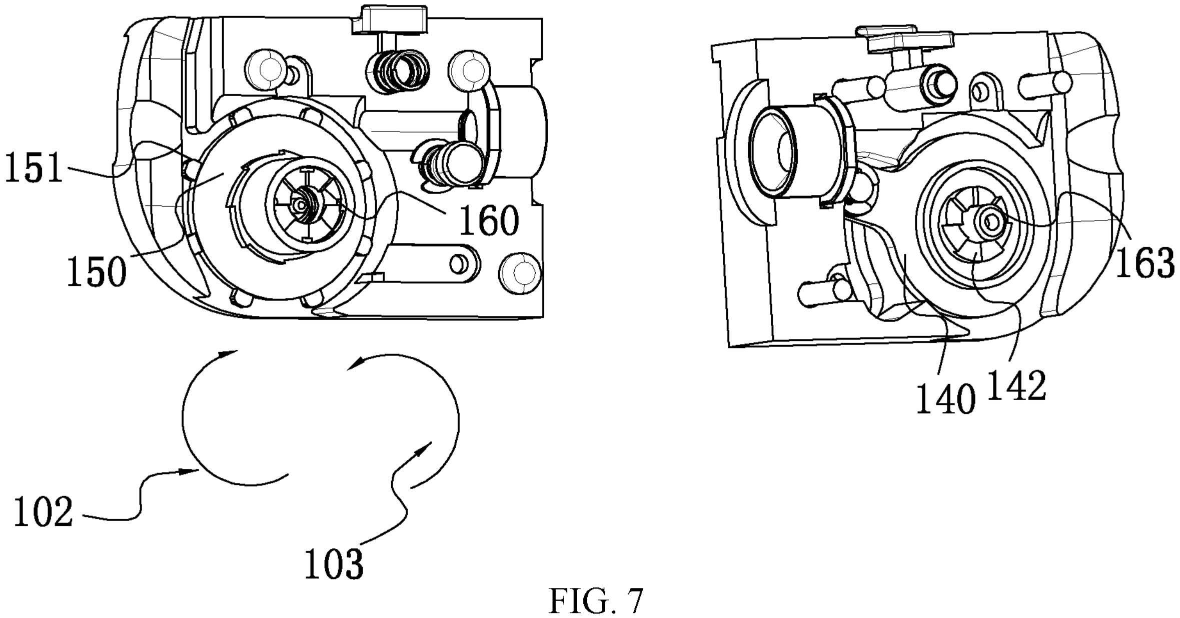
FIG. 7 is a schematic view of an internal structure of a nail feeding assembly of the tool attachment device of FIG. 1 according to the present disclosure.

Referring to FIGS. 6 and 7, the nail feeding assembly 120 further includes a connection device 140, and the connection device 140 is connected to the rocker 121 and rotates synchronously with the rocker 121. The connection device 140 includes a rotatable disk 141. When the rocker 121 rotates as the user presses the nail feeding shell 112, the rotatable disk 141 rotates as the rocker 121 rotates from the initial position to the end position, and when the rocker 121 moves to the end position, the connection device 140 correspondingly rotates by one stroke.

Figure 8:
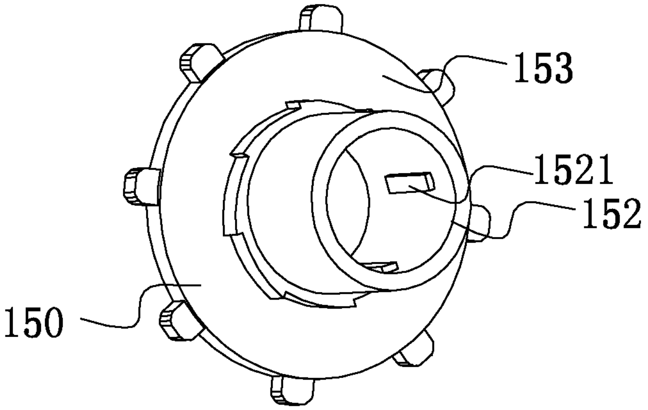
FIG. 8 is a structure view of a driving wheel of the tool attachment device of FIG. 1 according to the present disclosure.

Referring to FIG. 8, the nail feeding assembly 120 further includes a driving wheel 150, and nail feeding structures 151 are formed on the driving wheel 150 along a circumferential direction of the driving wheel 150; and the nail feeding structures 151 are protrusions, and the protrusions are radially and uniformly distributed on the driving wheel 150 along the circumferential direction of the driving wheel 150. The nail feeding structure 151 can cooperate with a nail belt, the nail belt is fixed by a plurality of protrusions, and the nail belt is provided with screws. The screws on the nail belt are sent to a front end of the extension rod 1111 through the rotation of the driving wheel 150 such that the extension rod 1111 drives the screws to rotate and push the screws into the workpiece.

Figure 9:
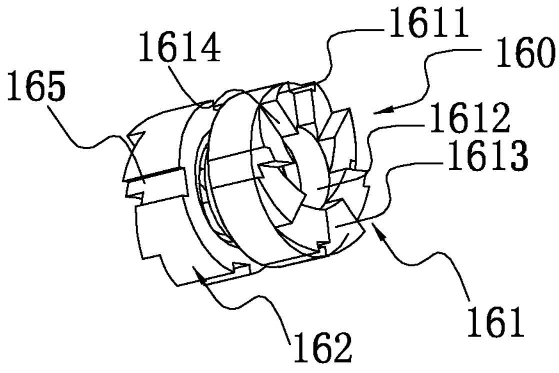
FIG. 9 is a structure view of a transmission assembly of the tool attachment device of FIG. 1 according to the present disclosure.
Figure 10:
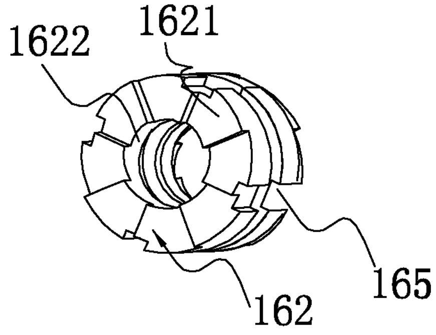
FIG. 10 is a structure view of a transmission assembly of the tool attachment device of FIG. 1 according to the present disclosure.
Figure 11:
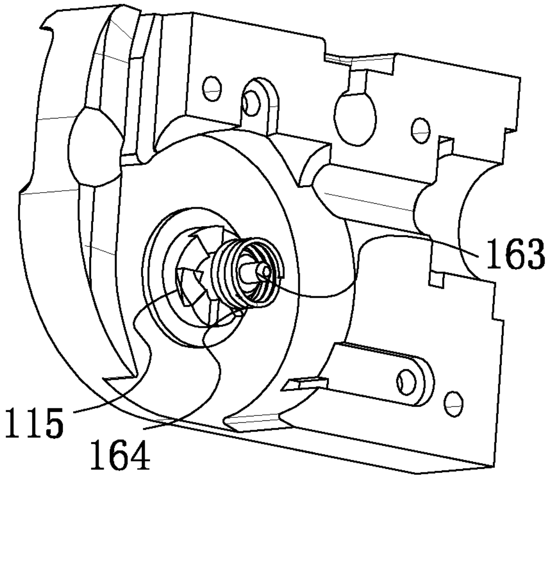
FIG. 11 is a structure view of a nail feeding shell of the tool attachment device of FIG. 1 according to the present disclosure.

Referring to FIGS. 9, 10, and 11, the nail feeding assembly 120 further includes a transmission assembly 160, the transmission assembly 160 is connected to the driving wheel 150 and the connection device 140 and configured to drive the driving wheel 150 to rotate unidirectionally, and the transmission assembly 160 is disposed between the connection device 140 and the driving wheel 150. The transmission assembly 160 can drive the nail feeding assembly 120 to rotate in a first direction 102, and the transmission assembly 160 is rotatable in a second direction 103 opposite to the first direction 102 relative to the nail feeding assembly 120. The first direction 102 may be a clockwise direction, and in this case, the second direction 103 is a counterclockwise direction. The transmission assembly 160 is connected to the driving wheel 150 in a unidirectional stop-rotation manner. Similarly, the transmission assembly 160 is connected to the connection device 140 in the unidirectional stop-rotation manner. The transmission assembly 160 is connected to the connection device 140 in the unidirectional stop-rotation manner in the first direction 102 such that the user presses the nail feeding shell 112 to drive the rocker 121 to rotate. Since the transmission assembly 160 is connected to the driving wheel 150 in the stop-rotation manner in the first direction 102, the connection device 140 is configured to drive the transmission assembly 160 to rotate. The transmission assembly 160 and a unidirectional driving wheel can rotate relative to each another in the second direction 103. When the user does not press the nail feeding shell 112, the nail feeding shell 112 slides relative to the main shell 111 and moves away from a tail end of the main shell 111 so that the rocker 121 is driven back to the initial position from the end position by the hole passage 113. In this case, the rocker 121 drives the connection device 140 to rotate in the second direction 103 when the rocker 121 returns, and the transmission assembly 160 causes the driving wheel 150 to stop rotating when the connection device 140 rotates in the second direction 103 so that the driving wheel 150 does not drive the nail belt to rotate in the second direction 103. In this manner, when the user presses the nail feeding shell 112 next time, the driving wheel 150 drives a next screw on the nail belt to the front end of the extension rod 1111 so that the screws on the nail belt are sequentially sent to the front end of the extension rod 1111.

Figure 5:
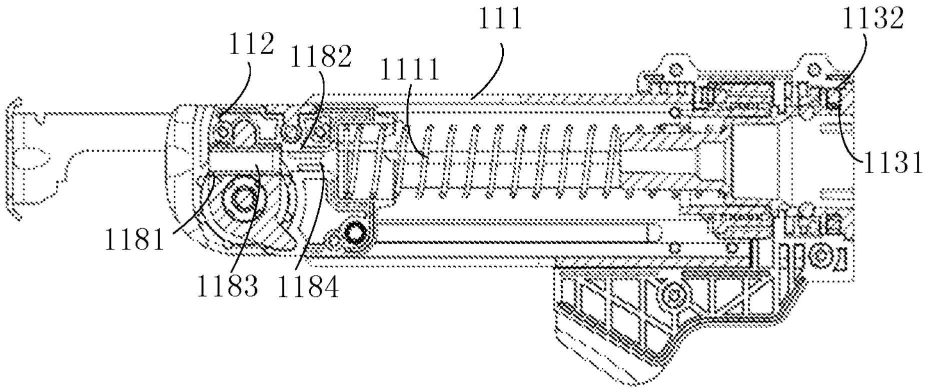
FIG. 5 is a sectional view of the tool attachment device of FIG. 1 according to the present disclosure.

Referring to FIG. 5, the shell assembly 110 further includes a guide structure 118, and the guide structure 118 is formed in the nail feeding shell 112. The guide structure 118 includes a first guide structure 1181 and a second guide structure 1182. A first guide through hole 1183 is formed in the first guide structure 1181, and a second guide through hole 1184 is formed in the second guide structure 1182. The first guide structure 1181 is connected to the second guide structure 1182 so that the first guide through hole 1183 communicates with the second guide through hole 1184. The second guide structure 1182 includes a guide bracket and a guide tube, the second guide through hole 1184 is formed in the guide tube, the guide tube is made of metal, and the guide bracket is made of plastic, thereby ensuring the strength of the guide structure 118, reducing the cost and facilitating the assembly.

Referring to FIGS. 9, 10, and 11, the transmission assembly 160 includes a first ratchet wheel 161, a second ratchet wheel 162, and a central shaft 163. The first ratchet wheel 161 includes a first ratchet 1611 and a first shaft hole 1612, and the central shaft 163 has a center line passing through an axis of the central shaft. The second ratchet wheel 162 includes a second ratchet 1621 and a second shaft hole 1622, and the central shaft 163 passes through the first shaft hole 1612 and the second shaft hole 1622. It is to be understood that the central shaft 163 may be two shaft bodies passing through the center line which are fixedly connected to the two half shells of the nail feeding shell 112, respectively, and the two shaft bodies are not connected to each other. A plurality of first ratchets 1611 are disposed on a side of the first ratchet wheel 161 and surround the first shaft hole 1612, and the first ratchet 1611 is formed with a step slope 1613 and a stop surface 1614. The connection device 140 further includes a first engagement portion 142 disposed on a side of the rotatable disk 141, and the connection device 140 is connected to the transmission assembly 160 in the unidirectional stop-rotation manner through the first engagement portion 142. The first engagement portion 142 is formed at a first stop-rotation ratchet disposed symmetrically with the first ratchet 1611, and the first ratchet 1611 is connected to the first stop-rotation ratchet in an engagement manner. The first ratchets 1611 are formed at a side surface of the first ratchet wheel 161 and uniformly surround the first shaft hole 1612. The stop surface 1614 is perpendicular to the side surface of the first ratchet wheel 161, the step slope 1613 is connected to the stop surface 1614, and a connection position between the step slope 1613 and the stop surface 1614 is a farthest vertical distance of the step slope 1613 from the side surface of the first ratchet wheel 161. Each step slope 1613 approaches the side surface of the first ratchet wheel 161 in the first direction 102, and the plurality of first ratchets 1611 are continuously disposed to form a ring body.

The first stop-rotation ratchet has a similar structure as the first ratchet 1611, and the first stop-rotation ratchet is formed at an inner side of the rotatable disk 141 and disposed opposite to the first ratchet 1611. The first stop-rotation ratchet is also formed with a step slope and a stop surface 1614, and an inclination direction of the step slope of the first stop-rotation ratchet is complementary to an inclination direction of the step slope 1613 of the first ratchet 1611 so that the step slope of each first stop-rotation ratchet approaches a side surface of the first engagement portion 142 where the first stop-rotation ratchet is located in the second direction 103. In this manner, when the connection device 140 rotates in the first direction 102, the first engagement portion 142 engages with the first ratchets 1611 so that the connection device 140 and the transmission assembly 160 rotate synchronously. When the connection device 140 rotates in the second direction 103, the first engagement portion 142 and the first ratchets 1611 slide and rotate relative to each another through cooperation between the step slopes.

The transmission assembly 160 further includes an elastic element 164 disposed between the first ratchet wheel 161 and the second ratchet wheel 162, and the elastic element 164 may be a spring or another device that can store energy through compression. The elastic element 164 is compressed by the first ratchet wheel 161 and the second ratchet wheel 162 and provides a biasing force that biases the first ratchet wheel 161 toward the first engagement portion 142. When the first ratchet wheel 161 rotates in the second direction 103 relative to the first engagement portion 142, the step slopes of the first ratchet wheel 161 and the first engagement portion 142 cause the first ratchet wheel 161 to slide along the central shaft 163 and move away from the first engagement portion 142 so that the elastic element 164 acts on the first ratchet wheel 161 to recover the engagement between the first ratchet wheel 161 and the first engagement portion 142.

The driving wheel 150 includes a drum 152 and a wheel disk 153. The drum 152 is formed with an accommodating cavity, and the transmission assembly 160 is placed in the accommodating cavity. The drum 152 is fixedly connected to the wheel disk 153 so that the drum 152 and the wheel disk 153 rotate synchronously. An inner wall of the drum 152 is formed with a first connection portion 1521, and the transmission assembly 160 includes a second connection portion 165. The first connection portion 1521 cooperates with the second connection portion 165 such that the transmission assembly 160 and the driving wheel 150 rotate synchronously. Merely one driving wheel 150 is provided, and the driving wheel 150 is disposed opposite to the connection device 140 so that the nail feeding assembly is compact. Optionally, the first connection portion 1521 is a protrusion structure formed at an inner wall of the driving wheel 150, and the protrusion structure is configured to be parallel to the central shaft 163; the second connection portion 165 is a groove structure formed on the first ratchet wheel 161 and the second ratchet wheel 162, and the groove structure is also configured to be parallel to the central shaft 163; and the first connection portion 1521 can be placed in the second connection portion 165 so that the first ratchet wheel 161, the second ratchet wheel 162, and the driving wheel 150 rotate about the center line synchronously, and the first ratchet wheel 161 and the second ratchet wheel 162 can generate displacement relative to the driving wheel 150 in a direction parallel to the center line. Optionally, the first connection portion 1521 is a groove structure 135, and the second connection portion 165 is a protrusion structure so that the transmission assembly 160 and the driving wheel 150 rotate synchronously.

The nail feeding structures 151 are uniformly distributed on the wheel disk 153 along a circumferential direction of the wheel disk 153 and are protrusions formed on a surface of the wheel disk 153, and every two protrusions are equally spaced. The nail belt is mounted through the nail feeding structures 151 so that the driving wheel 150 rotates to drive the nail belt to rotate so as to feed a nail to the front end of the extension rod 1111.

The shell assembly further includes a second engagement portion 115, and the second engagement portion 115 is formed at a second stop-rotation ratchet symmetrically distributed with the second ratchet 1621. The second ratchet wheel 162 is disposed opposite to the second engagement portion 115 so that the second ratchet wheel 162 and the second engagement portion 115 can slide relative to each another when the first ratchet wheel 161, the second ratchet wheel 162, and the driving wheel 150 rotate in the first direction 102 about the center line synchronously, and the second ratchet 1621 engages with the second engagement portion 115 to cause the second ratchet wheel 162 to stop rotating when the transmission assembly 160 has a tendency to move in the second direction 103. Since the second ratchet wheel 162 is rotatably connected to the driving wheel 150 in a synchronous manner, the driving wheel 150 does not rotate in the second direction 103. The second ratchet wheel 162 has a similar structure as the first ratchet wheel 161, and similarly, the second engagement portion 115 has a similar structure as the first engagement portion 142. Details will not be described herein.

A spacing between the nail feeding structures 151 on the driving wheel 150 cooperates with a size of the hole passage 113 so that in a stroke of the rocker 121 from the initial position to the end position in the hole passage 113, the corresponding nail feeding structure 151 feeds one screw. Therefore, the transmission assembly 160 cooperates with the driving wheel 150 and the connection device 140 such that the user presses the nail feeding shell 112 relative to the main shell 111 to trigger the rocker 121 to swing to drive the connection device 140 to rotate in the first direction 102. The first engagement structure of the connection device 140 engages with the first ratchet wheel 161 to drive the transmission assembly 160 to rotate in the first direction 102 such that the driving wheel 150 is driven to rotate for nail feeding. A spring is further disposed between the main shell 111 and the nail feeding shell 112. When the user does not press the nail feeding shell 112, the spring pushes the nail feeding shell 112 back to the front end of the main shell 111 so that the rocker 121 returns to the initial position from the end position in the hole passage 113, the rocker 121 drives the connection device 140 to rotate in the second direction 103, and the second ratchet wheel 162 engages with the second engagement portion 115 at this time to cause the driving wheel 150 to stop rotating. Moreover, the first ratchet wheel 161 and the first engagement portion 142 can rotate relative to each another so that the first ratchet wheel 161 does not prevent the rotation of the connection device 140. In this structure, the transmission assembly is disposed between the driving wheel 150 and the connection device 140, and the elastic element 164 is disposed between the first ratchet wheel 161 and the second ratchet wheel 162 so that an overall size of the nail feeding assembly 120 can be reduced. The nail feeding is implemented through the driving wheel 150 instead of a double-sided driving wheel, and the encapsulation and positioning of the transmission assembly are implemented by the driving wheel 150 so that the structure is simplified, and the accurate nail feeding to the power tool 200 with fewer parts is implemented, thereby reducing costs and facilitating assembly.

Figure 12:
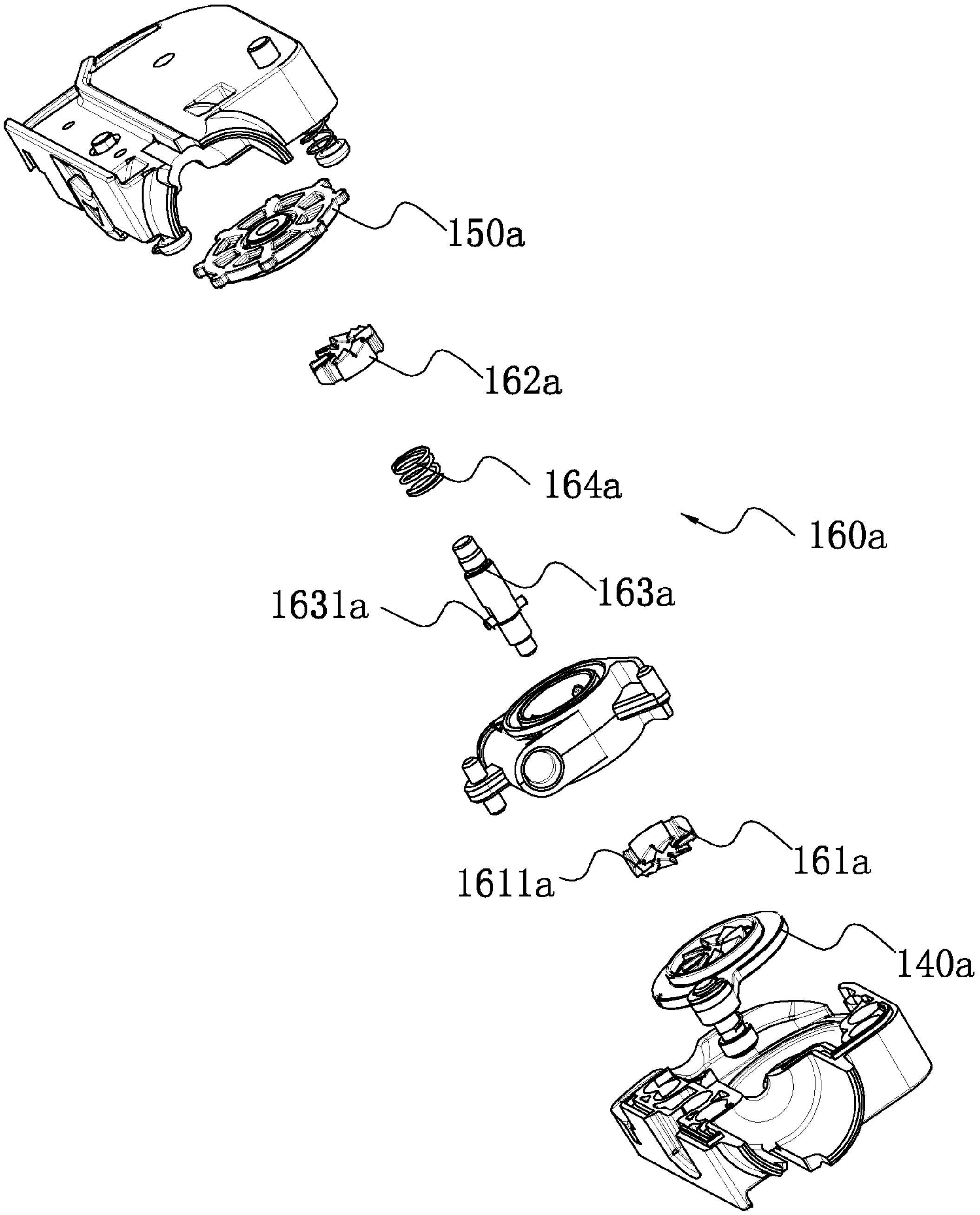
FIG. 12 is an exploded view of a nail feeding assembly according to an example of the present disclosure.

Referring to FIG. 12, in one example, the transmission assembly 160*a* includes a first ratchet wheel 161*a*, a second ratchet wheel 162*a*, and a central shaft 163*a*. The first ratchet wheel 161*a* includes a first ratchet 1611*a* and a first shaft hole, and the central shaft 163*a* has a center line passing through an axis of the central shaft. The second ratchet wheel 162*a* includes a second ratchet 1621*a* and a second shaft hole, and the central shaft 163*a* passes through the first shaft hole and the second shaft hole. The driving wheel 150*a* is fixedly connected to the central shaft 163*a*, and the central shaft 163*a* is rotatably connected to the first ratchet wheel 161*a* in a synchronous manner. The transmission assembly 160*a* further includes an elastic element 164*a* disposed between the first ratchet wheel 161*a* and the second ratchet wheel 162*a*. The nail feeding assembly further includes a connection device 140*a* connected to the transmission assembly 160*a*.

The driving wheel 150*a* includes a second engagement portion 115*a*, and the second engagement portion 115*a* is formed with a second stop-rotation ratchet symmetrically distributed with the second ratchet 1621*a*. The driving wheel 150*a* is fixedly connected to the central shaft 163*a*, and the central shaft 163*a* is rotatably connected to the first ratchet wheel 161*a* in the synchronous manner. The central shaft 163*a* is formed with a connection piece 1631*a*, and the connection piece 1631*a* is placed in the first ratchet wheel 161*a* so that the fixed connection between the first ratchet wheel 161*a* and the central shaft 163*a* is implemented.

The second ratchet wheel 162*a* is connected to the second stop-rotation ratchet in the unidirectional stop-rotation manner. In this manner, the connection device 140*a* drives the first ratchet wheel 161*a* to rotate synchronously when the connection device 140*a* rotates in the first direction 102*a*, and the first ratchet wheel 161*a* drives the central shaft 163*a* to rotate through the connection piece 1631*a* so that the driving wheel 150*a* rotates in the first direction 102*a*. When the transmission assembly 160*a* rotates in the second direction 103*a*, the second ratchet wheel 162*a* limits the second engagement portion 115*a*, and the second engagement portion 115*a* stops rotating so that the driving wheel 150*a* and the first ratchet wheel 161*a* do not rotate. In this example, the transmission assembly is connected to the driving wheel 150*a* through a rotating shaft so that the structure is similarly simple and a size can be decreased, and the strength of the first ratchet wheel 161*a* and the second ratchet wheel 162*a* can be increased, thereby ensuring the service life.

Figure 13:
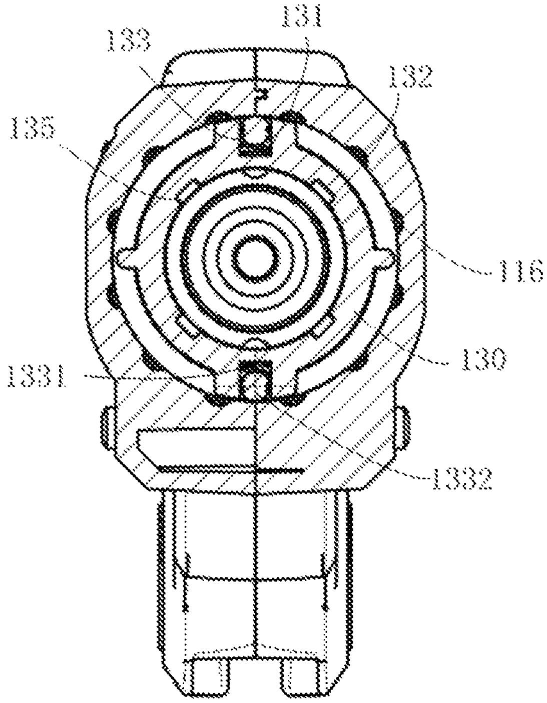
FIG. 13 is a sectional structure view of a shell assembly of FIG. 1 according to the present disclosure.

Referring to FIGS. 5 and 13, when the tool attachment device 100 is mounted to the power tool 200, the shell assembly 110 can rotate and be fixed to at least two positions relative to the power tool 200, thereby facilitating the adjustment of an angle of the tool attachment device 100 by the user and facilitating the operation. The mounting device 130 is disposed in the shell assembly 110 and rotatable relative to the shell assembly 110. The mounting device 130 includes a sliding groove 131, a stop-rotation connection portion 132 and a positioning device 133. The stop-rotation connection portion 132 is connected to the power tool 200 in the stop-rotation manner. The sliding groove 131 is disposed in the mounting device 130 and forms an opening on a surface of the mounting device 130. The positioning device 133 includes an elastic piece 1331 and a stop piece 1332. The stop piece 1332 is disposed in the sliding groove 131 and abuts against the elastic piece 1331. The stop piece 1332 can slide in the sliding groove 131 so that the stop piece 1332 has a position state in which the stop piece 1332 protrudes from the opening of the sliding groove 131 and thus a portion of the stop piece is exposed outside the opening, and the stop piece 1332 has another position state in which the stop piece compresses the elastic piece 1331 and slides into the interior of the sliding groove 131.

The shell assembly is formed with an accommodation space for accommodating the mounting device 130, and the mounting device 130 can rotate by a certain angle relative to the shell in the accommodation space. The shell assembly 110 includes a plurality of limiting grooves 116. Optionally, the plurality of limiting grooves 116 are uniformly distributed on an enclosure wall of the accommodation space along an axial direction, and a position of the limiting grooves 116 is aligned with a position of the sliding groove 131, that is, the limiting grooves 116 and the sliding groove 131 are located in a same radial direction of the first axis 101 so that the stop piece can be located in any one of the limiting grooves 116 and the sliding groove 131 at the same time.

The stop piece 1332 can be limited between the sliding groove 131 and the limiting groove 116 by the elastic piece 1331. A separation portion is formed between the limiting grooves 116 so that when the mounting device 130 does not receive a large torsion force, the separation portion limits the displacement of the stop piece 1332. In this manner, the stop piece 1332 is positioned between the limiting groove 116 and the sliding groove 131 so that the mounting device 130 is connected to the shell assembly 110 in the stop-rotation manner. When the user needs to adjust the angle of the tool attachment device 100, the shell assembly 110 and the power tool 200 are rotated relative to each another, and the torque to the mounting device 130 is increased by the power tool 200 so that the elastic piece 1331 is compressed to cause the stop piece 1332 to leave the limiting groove 116 instead of being located between the limiting groove 116 and the sliding groove 131. In this case, the mounting device 130 fixedly connected to the power tool 200 can rotate relative to the shell. When the mounting device 130 rotates relative to the shell assembly 110, the mounting device 130 drives the positioning device 133 in the mounting device 130 to rotate so that the sliding groove 131 is aligned with or adjacent to the limiting groove 116 at other positions. When the user does not apply the torque to the mounting device 130, the elastic piece 1331 is released so that the stop piece 1332 is driven to partially enter into the limiting groove 116. As a result, the mounting device 130 is connected to the shell assembly 110 in the stop-rotation manner once again.

The sliding groove 131 is configured to extend in the radial direction of the first axis 101 in the mounting device 130, the stop piece 1332 is provided as a ball, and an inner diameter of the opening of the sliding groove 131 is less than a diameter of the stop piece 1332 so that the stop piece 1332 cannot completely escape from the opening of the sliding groove 131.

Referring to FIG. 13, the mounting device 130 is formed with a connection cavity for insertion of the front end of the power tool 200 such that the power tool 200 is connected to the mounting device 130. The stop-rotation connection portion 132 is connected to the power tool 200 in the stop-rotation manner. The stop-rotation connection portion 132 is a groove 135 formed on the inner side of the mounting device 130. The front end of the power tool 200 is formed with a fitting portion 210 for connecting the tool attachment device 100. The fitting portion 210 is a convex rib 211 formed at the front end of the power tool 200 and the convex rib 211 is configured to be placed into the groove 135 along the first axis 101. Optionally, the stop-rotation connection portion 132 is four grooves 135 formed on the inner wall of the mounting device 130, the front end of the power tool 200 is provided with four convex ribs 211, the grooves 135 extend in two straight lines perpendicular to each other, and the convex ribs 211 extend in two straight lines perpendicular to each other.

In one example, the shell assembly includes a positioning ring. The positioning ring is sleeved on the positioning device along a circumferential direction of the positioning device, the positioning ring is fixedly connected to the shell, and the limiting groove is formed at the inner circumference of the positioning ring.

Figure 14:
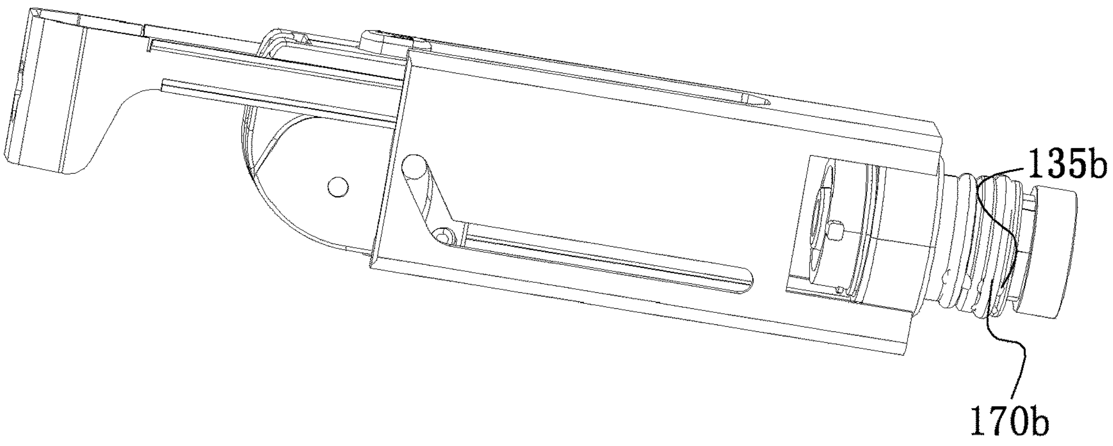
FIG. 14 is a structure view of a tool attachment device according to an example of the present disclosure.
Figure 15:
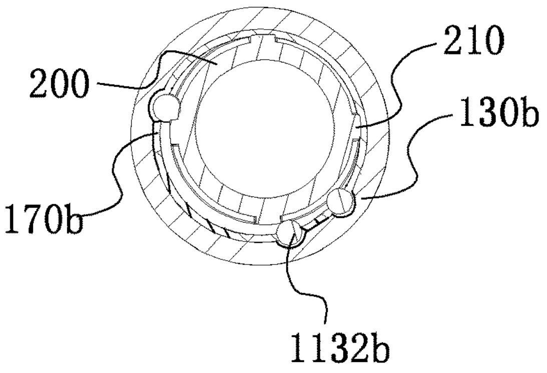
FIG. 15 is a sectional view of the tool attachment device of FIG. 14.
Figure 16:
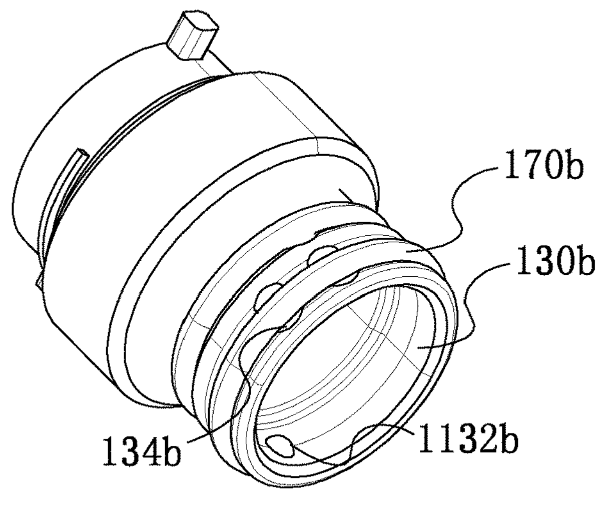
FIG. 16 is a structure view of a mounting device of the tool attachment device of FIG. 14.

Referring to FIGS. 14 to 16, in one example, the tool attachment device **100*b* includes a limiting ring 170*b*, a mounting device, and a stop piece 1132*b*. The mounting device 130*b* is disposed in the shell assembly 110*b* and configured to be connected to the front end of the power tool 200. The limiting ring 170*b* is disposed on a front end of the mounting device 130*b* along a circumferential direction. The stop piece 1132*b* abuts against the limiting ring 170*b*. The mounting device 130*b* includes at least two mounting holes 134*b*, the stop piece 1132*b* is placed in the mounting hole 134*b* and biased by the limiting ring 170*b* such that the stop piece 1132*b* clamps the fitting portion 210 to enable the power tool 200 to be rotatable relative to the tool attachment device 100*b*** and fixed to at least two positions.

Figure 17A:
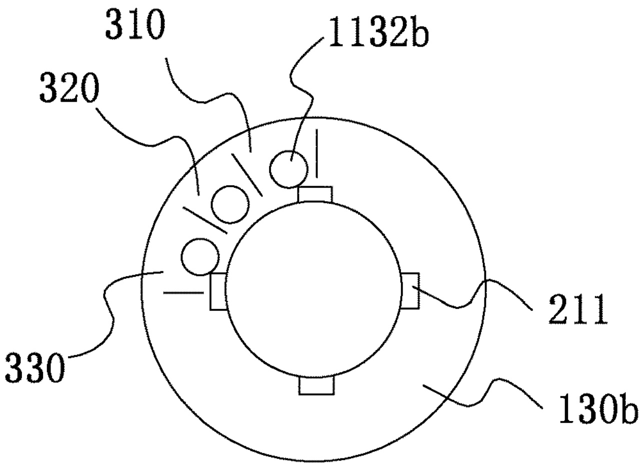
FIGS. 17A, 17B and 17C are schematic diagrams of angle adjustment of the tool attachment device of FIG. 14.
Figure 17B:
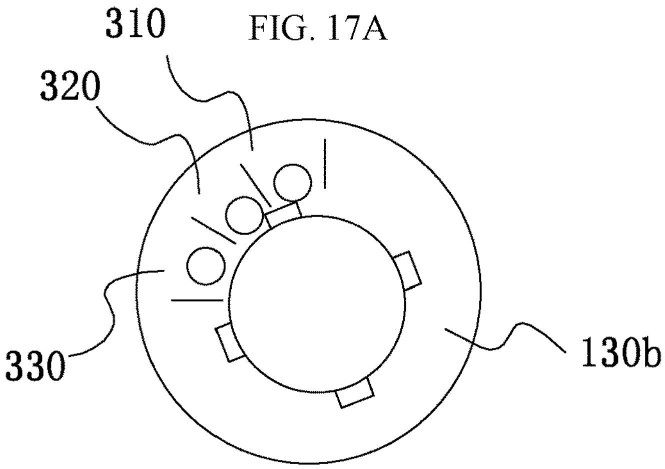
Figure 17C:
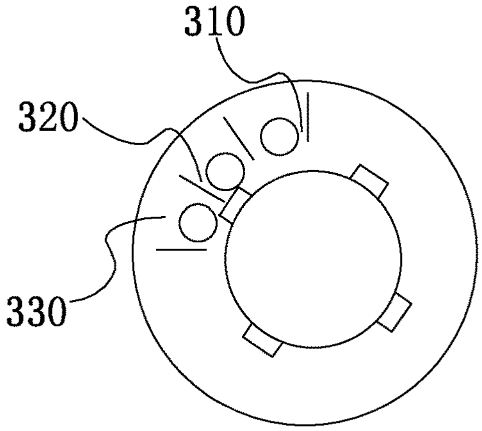

Referring to FIGS. 17A, 17B, and 17C, an inner periphery of the mounting device **130*b* is provided with the groove 135*b*, the front end of the power tool 200 is formed with the convex rib 211, and the convex rib 211 is configured to be placed into the groove 135*b* along the first axis 101*b*. The limiting ring 170*b* is the elastic piece 1331*b*, and the limiting ring 170*b* is configured to bias the stop piece 1132*b* to a locking position such that each stop piece 1132*b* prevents rotation of the convex rib 211 in a certain direction relative to the tool attachment device 100*b* in response to the power tool 200 being connected to the mounting device 130*b*. In this manner, the rotation of the convex rib 211 in two directions relative to the tool attachment device 100*b* is limited by at least two stop pieces 1132*b*** so that the power tool and the shell assembly are fixed relative to each other.

The stop piece **1132*b* is a ball, and the convex rib 211 is configured to press the stop piece 1132*b* to disengage the stop piece 1132*b* from the locking position. At least two stop pieces 1132*b* are provided, and at least two convex ribs 211 are provided. When the power tool 200 is connected to the mounting device 130*b*, a plurality of stop pieces 1132*b* clamp at least one convex rib 211 so that the power tool 200 is fixed to a certain position relative to the tool attachment device 100*b***.

Figure 18A:
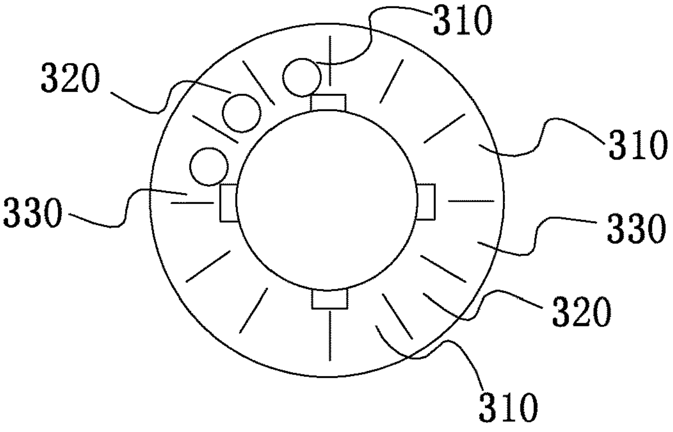
FIG. 18A is a structure diagram illustrating distribution of a type of stop pieces of the tool attachment device of FIG. 14 in a positioning section.
Figure 18B:
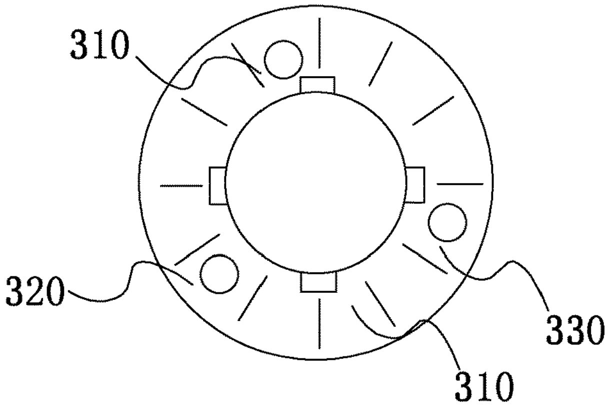
FIG. 18B is a structure diagram illustrating distribution of a type of stop pieces of the tool attachment device of FIG. 14 in a positioning section.
Figure 18C:
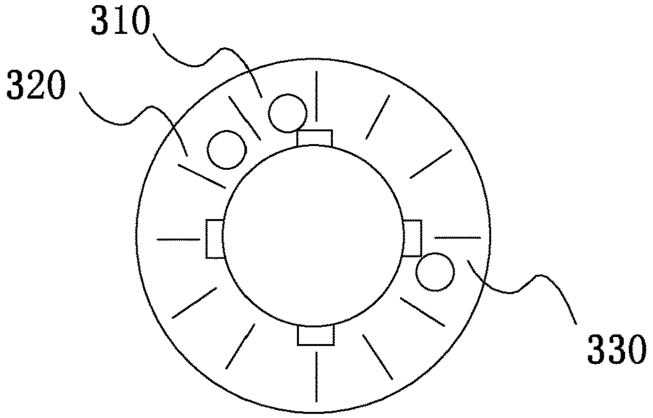
FIG. 18C is a structure diagram illustrating distribution of another type of stop pieces of the tool attachment device of FIG. 14 in a positioning section.

Referring to FIGS. 18A, 18B and 18C, N stop pieces **1132*b* are provided, and M convex ribs 211 are provided; in a cross-section along a circumferential direction of the first axis 101*b*, N equally divided positioning sections of a first positioning section 310, a second positioning section 320, . . . , and an N-th positioning section are generated in M sections which are equally divided, and the stop pieces 1332*b* are configured to pass through the first positioning sections 310, the second positioning sections 320**, and the N-th positioning sections, respectively.

Optionally, three stop pieces **1132*b* are provided, four convex ribs 211 are provided, the convex rib 211** is configured to pass through a first straight line or a second straight line, and the first straight line is configured to be perpendicular to the second straight line.

The stop pieces 1132*b* are disposed in the first positioning section 310, the second positioning section 320, and a third positioning section 330, respectively, and when the convex rib 211 is rotated to any two of the first positioning section 310, the second positioning section 320, and the third positioning section 330, the convex rib 211 is clamped by two stop pieces 1132*b*. This example does not need to be provided with the limiting groove 116*b*, and the multi-angle adjustment of the shell assembly 110*b* can be completed through the cooperation of the limiting ring 170*b* and the power tool 200. The structure is simple and a size of the shell assembly 110*b* can be reduced, and the angle adjustment of the shell assembly 110*b* can be simply and effectively implemented.

Figure 19A:
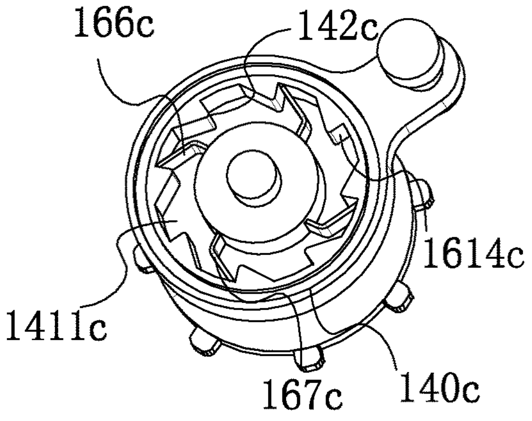
FIGS. 19A, 19B and 19C are structure views of a nail feeding assembly according to an example of the present disclosure.
Figure 19B:
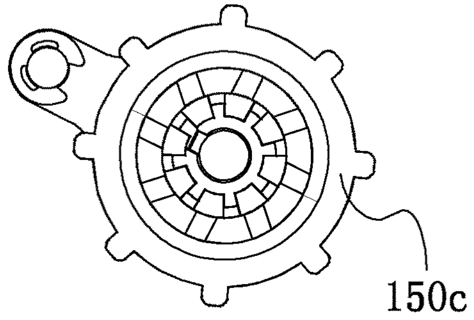
Figure 19C:
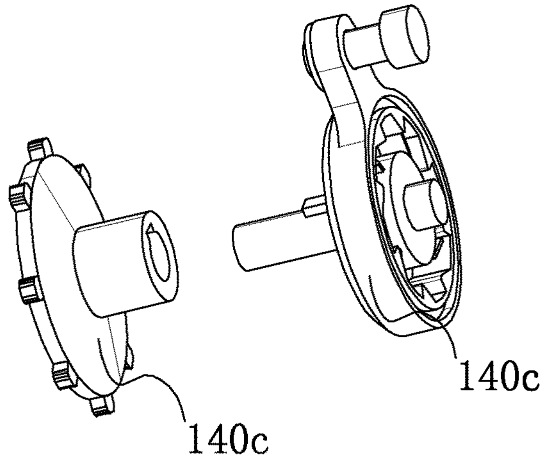

Referring to FIGS. 19A, 19B and 19C, in one example of the present disclosure, the connection device 140*c* includes a rotatable disk 141*c* and a first engagement portion 142*c* disposed on a side of the rotatable disk 141*c*, and the first engagement portion 142*c* is connected to the transmission assembly 160*c* in the unidirectional stop-rotation manner.

A side of the rotatable disk 141*c* is formed with a mounting groove 1411*c*, and the first engagement portion 142*c* forms a side wall of the mounting groove 1411*c*. The transmission assembly 160*c* includes an elastic driving element 166*c*, and the elastic driving element 166*c* is disposed in the mounting groove 1411*c* and unidirectionally rotatable in the mounting groove 1411*c*.

The transmission assembly 160*c* includes a central shaft 163*c*, and the central shaft 163*c* is fixedly connected to the elastic driving element 166*c*. The elastic driving element 166*c* is formed with at least two extension arms 167*c*, and the first engagement portion 142*c* is configured to limit the at least two extension arms 167*c* to rotate merely unidirectionally in the mounting groove 1411*c*. The first engagement portion 142*c* is formed with a step slope and a stop surface 1614*c* at a side wall of the mounting groove 1411*c*, the step slope is connected to the stop surface 1614*c*, and the extension arms 167*c* are also obliquely disposed. A side of the driving wheel 150*c* is provided with ratchets, and correspondingly, the nail feeding shell 112*c* is formed with a second engagement portion 115*c*. The second engagement portion 115*c* is connected to the ratchets in the unidirectional stop-rotation manner, and the specific principle is similar to that in the above example and will not be described in detail here.

When the connection device 140*c* rotates in the first direction 102*c*, the extension arm 167*c* abuts against the stop surface 1614*c* so that the connection device 140*c* is connected to the elastic driving element 166*c* in the stop-rotation manner, and the connection device 140*c* and the center shaft 163*c* rotate synchronously in the first direction 102*c*. When the connection device 140*c* moves in the second direction 103*c*, the elastic driving element 166*c* is elastically deformed and slides over the stop surface 1614*c* from the step slope so that the connection device 140*c* rotates relative to the elastic driving element 166*c*. In this example, the transmission assembly 160*c* is embedded in the connection device 140*c* so that the size of the whole machine can be reduced and the nail feeding assembly 120*c* has a simple and compact structure.

Figure 20:
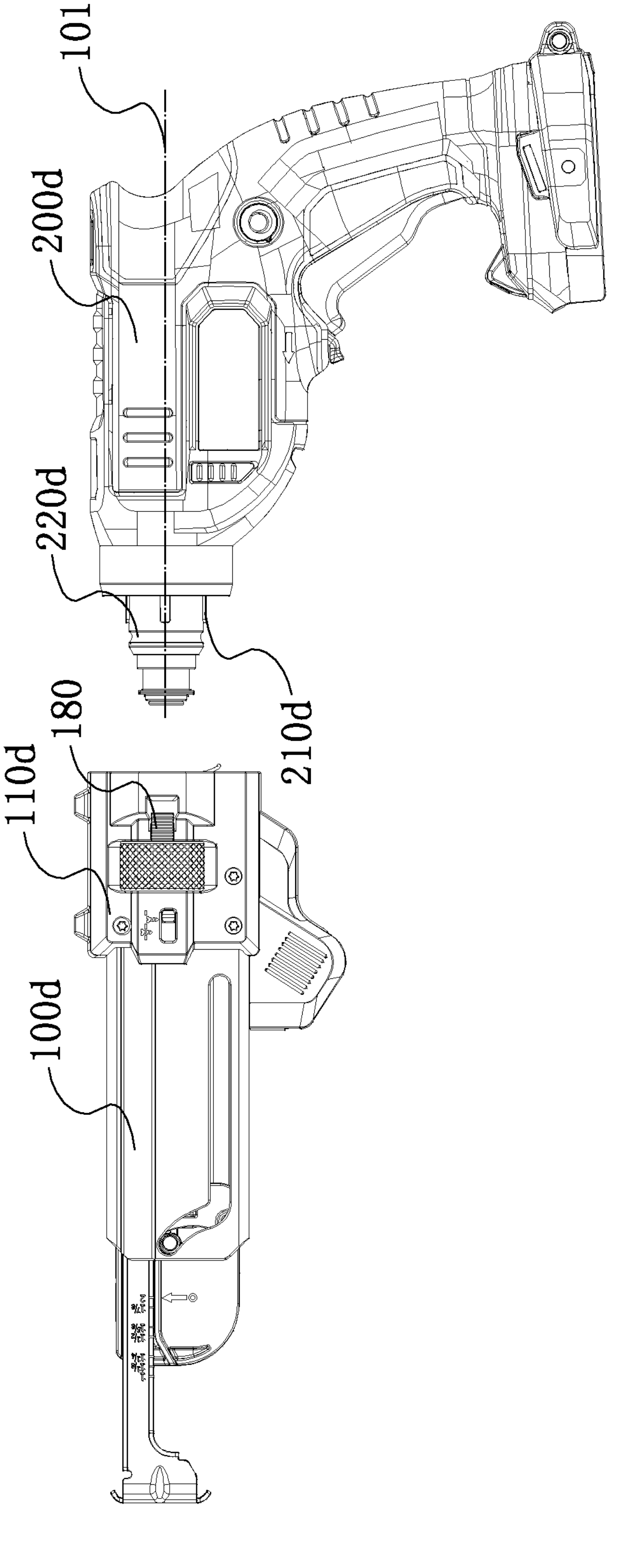
FIG. 20 is a planar view of a power tool system according to an example of the present disclosure.
Figure 24:
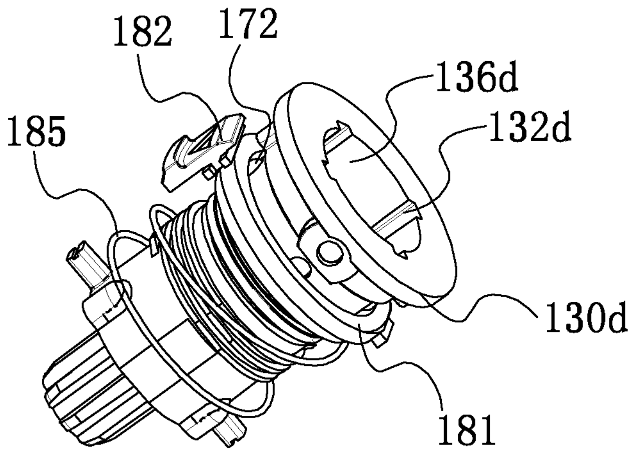
FIG. 24 is a structure view of a switching device and a mounting device of a tool attachment device of FIG. 20.

Referring to FIGS. 20 and 24, in one example, the tool attachment device 100*d* further includes a connection hole 171 and a roll ball 172. The connection hole 171 is disposed in the mounting device 130*d* and penetrates through the mounting device 130*d* so as to form openings on two sides of the mounting device 130*d*, and the roll ball 172 is disposed in the connection hole 171. The roll ball 172 is provided as a ball, and the roll ball 172 can roll in the connection hole 171 and relatively move to a first position and a second position in the connection hole 171. A hole diameter of the connection hole 171 matches a diameter of the roll ball 172 so that the roll ball 172 can roll in the connection hole 171, and part of the ball 172 can protrude from the connection hole 171 without being separated from the connection hole 171.

Figure 21:
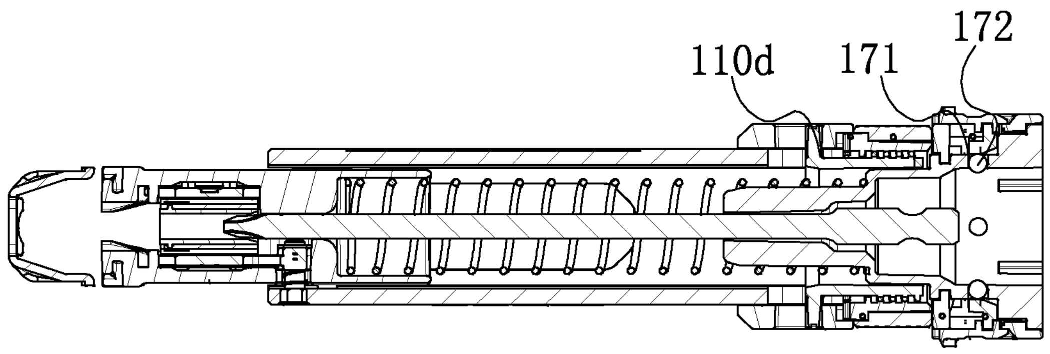
FIG. 21 is a sectional view of a tool attachment device of FIG. 20 when a switching device is in a first state.
Figure 22:
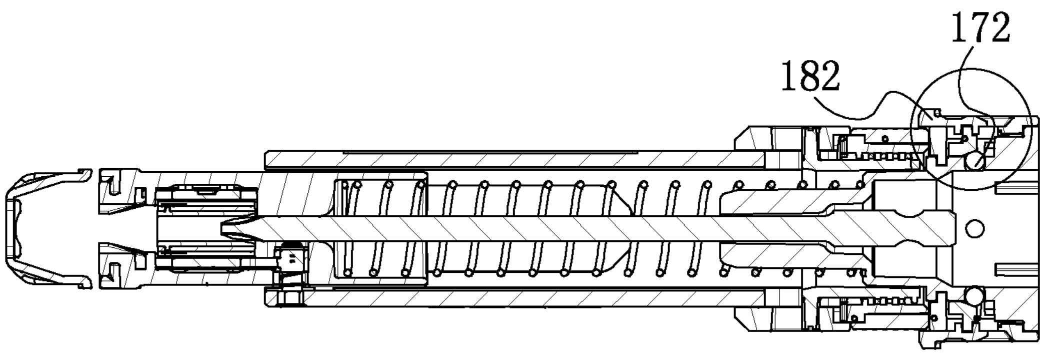
FIG. 22 is a sectional view of a tool attachment device of FIG. 20 when a switching device is in a second state.
Figure 23:
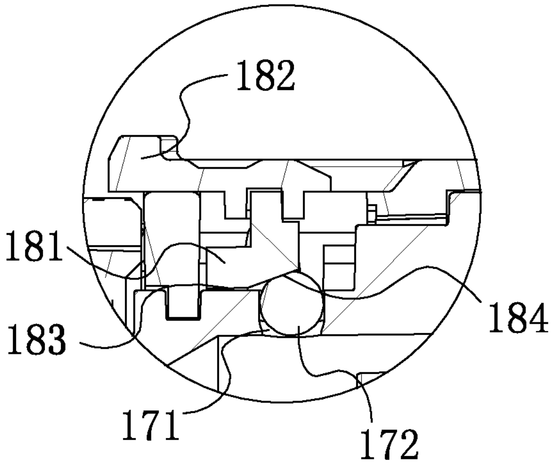
FIG. 23 is an enlarged view of part of the configuration in FIG. 20.

Referring to FIG. 20, the tool attachment device 100*d* further includes a switching device 180, and the switching device 180 has a locking state and an unlocking state. Referring to FIG. 21, the switching device 180 limits the roll ball 172 in a first position where the tool attachment device 100*d* is connected to the power tool 200*d* when the switching device 180 is in the locking state. Referring to FIG. 22, the switching device 180 allows the roll ball 172 to move between the first position and the second position within the connection hole 171 when the switching device 180 is in the unlocking state. The mounting device 130 is hollow inside so that a connection cavity 136*d* is formed, the front end of the power tool 200 is inserted into the connection cavity so as to be connected to the mounting device 130*d* so that the tool attachment device 100*d* is connected to the power tool 200*d* in a fit manner. An inner side of the mounting device 130*d* is formed with a stop-rotation connection portion 132*d*. The front end of the power tool 200*d* is formed with a fitting portion 210*d*, and the fitting portion 210*d* can be connected to the stop-rotation connection portion 132*d* in the stop-rotation manner.

Optionally, the stop-rotation connection portion 132*d* is a groove formed on an enclosure wall of the connection cavity 136*d*, and the fitting portion 210*d* is a corresponding convex rib formed at the front end of the power tool 200*d*. When the front end of the power tool 200*d* is placed in the connection cavity 136*d*, the convex rib is pushed into the groove so that the power tool 200*d* is connected to the tool attachment device 100*d* in the stop-rotation manner. Optionally, an inner wall of the mounting device 130*d* is provided with four grooves, the front end of the power tool 200*d* is provided with four convex ribs, the grooves extend in two straight lines perpendicular to each other, and the convex ribs extend in two straight lines perpendicular to each other.

The front end of the power tool 200*d* is further provided with a fitting groove 220*d*, and the fitting groove 220*d* may be an annular groove disposed on the front end of the power tool 200*d* along the circumferential direction of the power tool or a spherical groove disposed on the power tool 200*d*. The first limiting portion 183 can limit the roll ball 172 to be between the fitting groove 220*d* and the connection hole 171 so that the relative displacement between the power tool 200*d* and the tool attachment device 100*d* in a direction parallel to the first axis 101 can be limited through the roll ball 172, and a state in which the power tool 200*d* is connected to the tool attachment device can be maintained through the cooperation between the roll ball 172 and the groove. When the roll ball 172 is in the first position, part of the roll ball 172 extends from the connection hole 171 into the connection cavity 136*d*; and when the roll ball 172 is in the second position, the roll ball 172 does not extend beyond the connection hole 171 in the direction toward the connection cavity 136*d*.

Optionally, referring to FIG. 24, the switching device 180 includes a locking piece 181 and a switch 182 which are disposed outside an opening of the connection hole 171. The locking piece 181 includes the first limiting portion 183 and a second limiting portion 184. In the radial direction of the first axis 101, the first limiting portion 183 is close to the first axis 101 relative to the second limiting portion 184. The switch 182 is connected to the locking piece 181 for moving the locking piece 181 by the user. The locking piece 181 is disposed on an outer periphery of the mounting device. In the radial direction of the first axis 101, the first limiting portion 183 and the second limiting portion 184 can be operated to be aligned with the connection hole 171. The switch 182 is moved to drive the locking piece 181 to move so as to switch a limiting portion aligned with the connection hole 171. When the first limiting portion 183 is operated to be aligned with the connection hole 171, the first limiting portion 183 protrudes relative to the second limiting portion 184 so that the roll ball 172 is pressed to the first position, and the switching device 180 is in the locking state at this time. When the second limiting portion 184 is aligned with the connection hole 171, the second limiting portion 184 is far away from the connection hole 171 relative to the first limiting portion 183, and the second limiting portion 184 does not press the roll ball 172 so that the roll ball 172 can move between the first position and the second position of the roll ball 172 within the connection hole 171, and the switching device 180 is in the unlocking state at this time.

Optionally, the switching device 180 further includes a biasing piece 185 connected to the locking piece 181, and the biasing piece 185 has a biasing force to maintain the switching device 180 in the locking state. The biasing piece 185 is an elastic piece and can be connected to the switch 182 or the locking piece 181. When the switch 182 is not operated, the biasing piece 185 presses the switch 182 or the locking piece 181 to maintain the switching device 180 in the locking state. After the user operates the switch 182, the biasing force of the biasing piece 185 is overcome so that the switching device 180 is in the unlocking state. After the power tool 200*d* is connected to the mounting device 130*d*, the switching device 180 is in the unlocking state by the switch 182, and at this time, the power tool 200*d* can be disengaged from the mounting device 130*d*.

The locking piece 181 may be a stepped structure disposed at a front end of the connection hole. Optionally, the locking piece 181 is a ring body sleeved on a circumferential side of the mounting device 130*d*, and the second limiting portion 184 has a slope surface or a curved surface gradually approaching the first axis 101 in the direction of the first axis 101. In this manner, when the user mounts the power tool 200*d* to the mounting device 130*d*, the front end of the power tool 200*d* can be mounted into the connection cavity 136*d* in the direction of the first axis 101, and the front end of the power tool 200*d* presses the roll ball 172 and drives the locking piece 181 to move through the slope surface or the curved surface so that the switching device 180 moves to the unlocking state to allow the power tool 200*d* to be mounted to the mounting device 130*d*. When the roll ball 172 is located between the fitting groove 220*d* and the connection hole 171, the biasing piece 185 drives the locking piece 181 back to the locking state.

Optionally, when the power tool 200*d* is mounted to the mounting device 130*d*, the switch 182 is moved to maintain the switching device 180 in the unlocking state, and the power tool 200*d* is mounted into the mounting device 130*d*; and when the switch 182 is released to cause the switching device 180 back to the locking state, the tool attachment device 100*d* is fixedly connected to the power tool 200*d* at this time.

Optionally, a plurality of connection holes 171 and a plurality of roll balls 172 are provided, and when the switching device 180 is in the unlocking state, the mounting device 130*d* can rotate relative to the shell assembly 110*d* to change a roll ball 172 locked by the switching device 180. A plurality of switches 182, a plurality of first limiting portions 183 and a plurality of second limiting portions 184 may be provided to lock a plurality of roll balls 172.

Optionally, the mounting device is integrally formed with the shell assembly, the connection hole and the roll ball are disposed inside the shell assembly, the switching device is disposed opposite to the mounting device, and the user drives the mounting device to move relative to the switching device to implement the locking connection and unlocking connection of the power tool.

Optionally, the mounting device 130*d* is disposed in the shell assembly 110*d* and rotatable relative to the shell assembly 110*d*. The mounting device 130*d* includes the sliding groove, the sliding groove is disposed in the mounting device 130*d*, and the opening and the positioning device are formed on the surface of the mounting device 130*d*. The positioning device includes the elastic piece and a stop piece, and the stop piece is disposed in the sliding groove and abuts against the elastic piece. The shell assembly 110*d* includes a plurality of limiting grooves, and the roll ball 172 can be limited between the sliding groove and the limiting groove by the elastic piece. Optionally, the nail feeding structures are formed on the driving wheel along the circumferential direction of the driving wheel; and the tool attachment device 100*d* further includes the transmission structure, the transmission structure is connected to the driving wheel and the connection device and drives the driving wheel to rotate unidirectionally, and the transmission structure is disposed between the connection device and the driving wheel.

Figure 25:
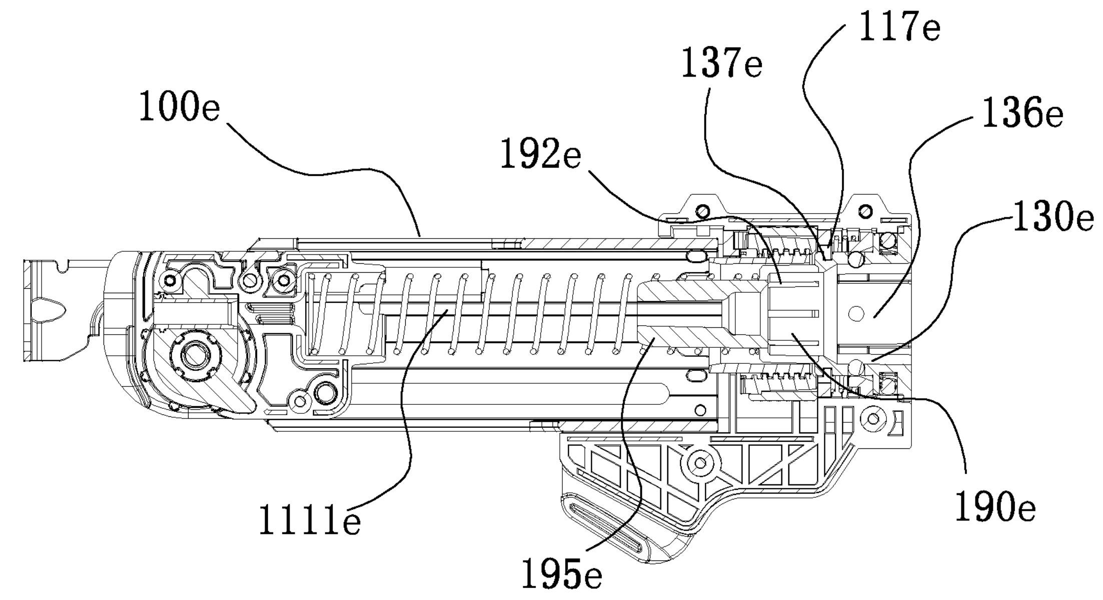
FIG. 25 is a sectional view of a tool attachment device according to an example of the present disclosure.

Optionally, referring to FIG. 25, the mounting device 130*e* further includes a trench 137*e*, the shell assembly 110*e* includes a rib plate 117*e*, at least one of the trench 137*e* and the rib plate 117*e* is of an annular structure, and the trench 137*e* is stuck in the rib plate 117*e* so that the mounting device 130*e* is connected to the shell assembly 110*e* and rotatable about the first axis 101.

Figure 26:
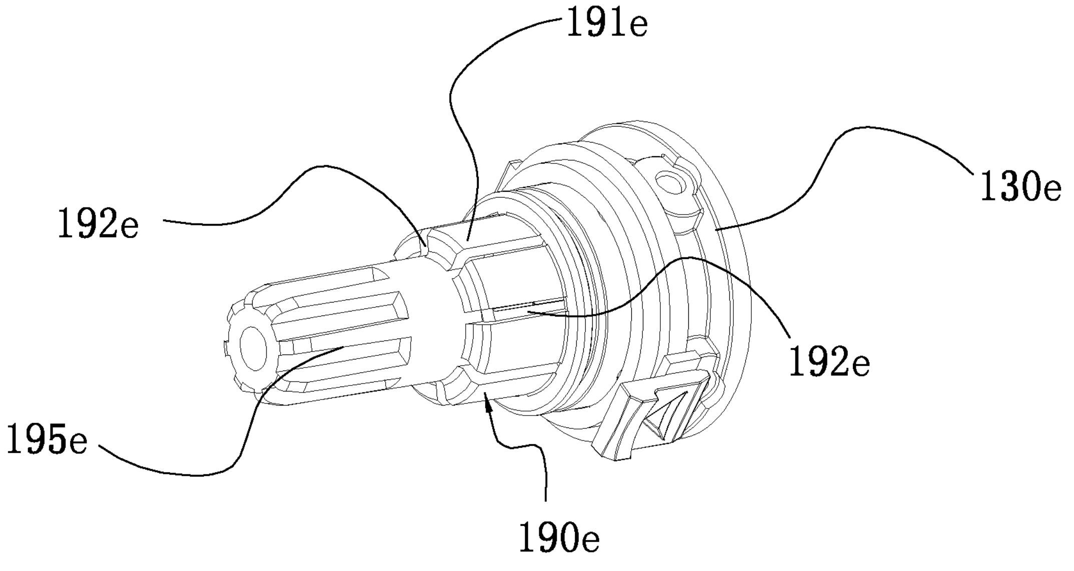
FIG. 26 is a perspective view of a dustproof device and a mounting device of the tool attachment device of FIG. 25.
Figure 27:
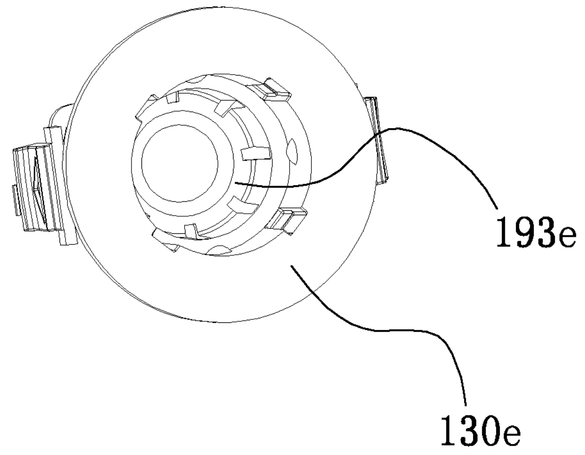
FIG. 27 is a perspective view of a dustproof device and a mounting device of the tool attachment device of FIG. 25 from another angle.

Referring to FIGS. 25 to 27, when the power tool system operates, a screw is driven into the workpiece by the extension rod 1111*e*, and when the screw is screwed into the workpiece, dust and debris are easily generated at the front end of the tool attachment device 100*e* and enter the connection position between the mounting device 130*e* and the shell assembly 110*e* and enter between the rib plate 117*e* and the trench 137*e* from the front end of the tool attachment device 100*e*. The accumulation of dust over a long period of time may cause the mounting device 130*e* and the shell assembly 110*e* to stop rotating, thereby affecting the relative rotation of the power tool and the tool attachment device 100*e*. Here, the nail feeding assembly 120*e* is defined to be located at the front end of the mounting device 130*e*. In order to solve this problem, the present disclosure provides an example in which the tool attachment device 100*e* further includes a dust exhaust device 190*e*. The dust exhaust device 190*e* is disposed between the mounting device 130*e* and the nail feeding assembly 120*e* to prevent dust generated due to operation of the power tool system from entering between the mounting device 130*e* and the shell assembly 110*e*. When part of the dust generated due to operation of the power tool system flows from a front end of the interior of the shell assembly 110*e* of the tool attachment device 100*e* to the mounting device 130*e* at the rear end, the dust exhaust device 190*e* prevents the dust from flowing between the mounting device 130*e* and the shell assembly 110*e* to prevent the dust from hindering the relative rotation of the mounting device 130*e* and the shell assembly 110*e*. The dust exhaust device 190*e* further includes a partition portion, the partition portion is disposed at the front end of the mounting device 130*e*, and the partition portion is attached to an inner wall of the shell assembly 110*e* so that the dust can be blocked from flowing between the rib plate 117*e* and the trench 137*e*. In this manner, the mounting device 130*e* and the shell assembly 110*e* can be prevented from stopping rotating due to the accumulation of the dust between the trench 137*e* and the rib plate 117*e*.

The dust exhaust device 190*e* includes a dust exhaust box 191*e* and dust exhaust ports 192*e*. At least part of the dust exhaust ports 192*e* are disposed facing toward the nail feeding assembly 120*e*, that is, at least part of the dust exhaust ports 192*e* are disposed facing toward a front end opening so that the dust generated at the front end of the tool attachment device 100*e* enters the shell assembly 110*e* and enters the dust exhaust box 191*e* through the dust exhaust port 192*e*. The dust exhaust box 191*e* further includes a dust exhaust cavity 193*e*, and the dust exhaust cavity 193*e* is formed within the dust exhaust box 191*e* and configured to receive the dust entering from the dust exhaust port 192*e*. Optionally, the dust exhaust cavity 193*e* is formed within the dust exhaust box 191*e*, and the dust exhaust cavity 193*e* communicates with the connection cavity 136*e* of the mounting device 130*e* so that the dust enters the connection cavity 136*e* in the interior of the mounting device 130*e* through the dust exhaust port 192*e* and can be exhausted from the connection cavity 136*e* to the outside. The dust is exhausted from the interior of the mounting device 130*e* to the outside and does not enter the outside of the mounting device 130*e*. Since the shell assembly 110*e* is disposed outside the mounting device 130*e*, the dust does not enter between the shell assembly 110*e* and the mounting device 130*e*.

A plurality of dust exhaust ports 192*e* are provided and extend from a front end of the dust exhaust box 191*e* to a side end of the dust exhaust box 191*e*. Part of the dust can enter the dust exhaust cavity 193*e* from a side surface of the dust exhaust box 191*e* to prevent the dust from blocking the dust exhaust port 192*e*.

Optionally, the dust exhaust device 190*e* is integrally formed with the mounting device 130*e*, and the dust exhaust cavity 193*e* communicates with the connection cavity 136*e*. The tool attachment device further includes a guide piece 195*e* for positioning the extension rod 1111*e*, and the guide piece 195*e* is connected to the dust exhaust device 190*e* and disposed at the front end of the dust exhaust device 190*e*. In a projection direction of the first axis 101, the dust exhaust port 192*e* is disposed on a circumferential side of the guide piece 195*e*. Optionally, the guide piece 195*e* is integrally formed with the dust exhaust device.

Figure 28:
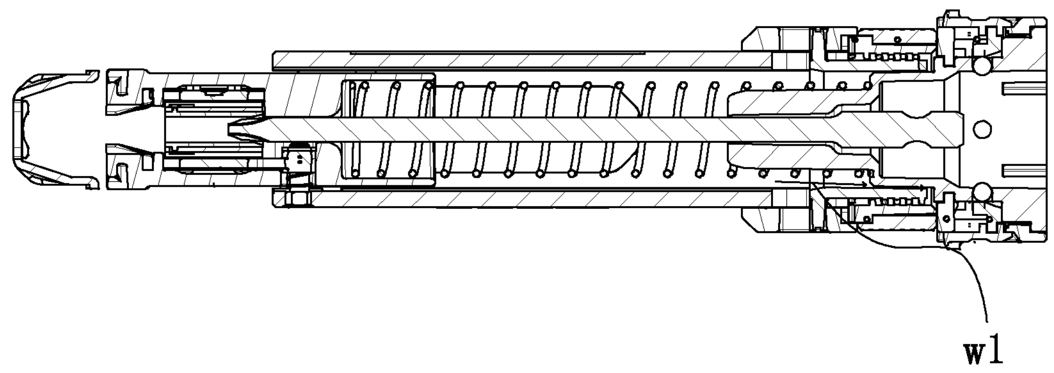
FIG. 28 is a schematic view of a dust flow path inside a tool attachment device without a dustproof device.
Figure 29:
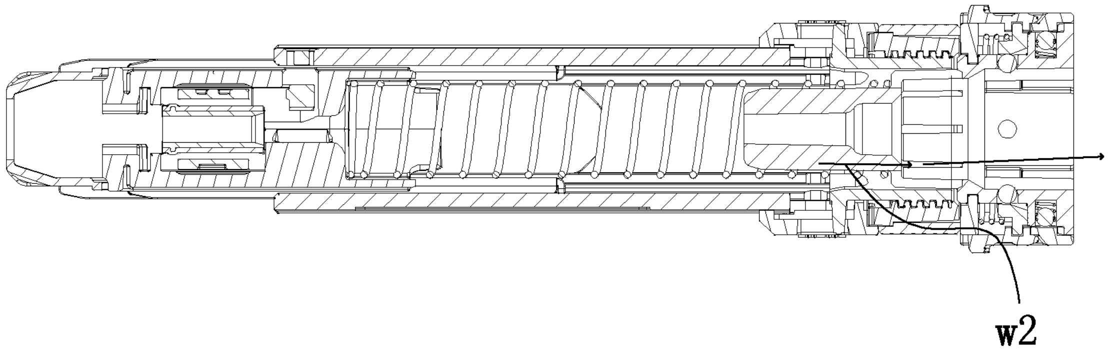
FIG. 29 is schematic view of a dust flow path inside the tool attachment device of FIG. 27.

Referring to FIGS. 28 and 29, FIG. 28 illustrates a dust exhaust path W1 of the tool attachment device without the dust exhaust device, and the dust directly enters the connection position of the mounting device and the shell assembly from the interior of the shell assembly; and FIG. 29 illustrates a dust exhaust path W2 of the tool attachment device provided with the dust exhaust device, and the dust exhaust device guides the dust to be exhausted from the connection cavity of the mounting device. The mounting device of this example may be any of the mounting devices provided in the present disclosure.

Optionally, the dust exhaust cavity 193*e* is directly formed with the dust exhaust port 192*e* at a side of the shell assembly 110*e*, and the dust exhaust port 192*e* is disposed in front of the rib plate 117 so that the dust generated at the front end is guided to directly enter the dust exhaust cavity 193*e* from the dust exhaust port 192*e* and directly be exhausted from the side of the shell assembly 110*e*, and the dust does not enter between the shell assembly 110*e* and the mounting device 130*e*.

The above illustrates and describes basic principles, main features and advantages of the present disclosure. It is to be understood by those skilled in the art that the above examples do not limit the present disclosure in any form, and technical solutions obtained by means of equivalent substitution or equivalent transformation all fall within the scope of the present disclosure and claims appended hereto.

What is claimed is:

1. A tool attachment device for assisting a power tool in performing nailing, comprising:

a shell assembly, wherein a side of the shell assembly is formed with a hole passage;

a rocker partially placed in the hole passage and rotatable in the hole passage;

a connector rotatably coupled to the rocker and rotatable synchronously with the rocker;

a driving wheel, comprising a plurality of nail feeding structures formed on the driving wheel along a circumferential direction of the driving wheel; and a transmission coupled to the driving wheel and the connector to drive the driving wheel to rotate unidirectionally, wherein the transmission is disposed between the connector and the driving wheel, and the transmission comprises a first ratchet wheel, a second ratchet wheel, and an elastic element, the elastic element is disposed between the first ratchet wheel and the second ratchet wheel, and the elastic element is a device that can store energy through compression.

2. The tool attachment device of claim 1, wherein the connector comprises a rotatable disk and a first engagement portion disposed on a side of the rotatable disk and the first engagement portion is connected to the transmission in a unidirectional stop-rotation manner.

3. The tool attachment device of claim 2, wherein the transmission comprises a central shaft, the first ratchet wheel comprises a first ratchet and a first shaft hole, the second ratchet wheel comprises a second ratchet and a second shaft hole, and the central shaft passes through the first shaft hole and/or the second shaft hole.

4. The tool attachment device of claim 3, wherein a plurality of first ratchets are disposed on a side of the first ratchet wheel and surround the first shaft hole, the first ratchet is formed with a step slope and a stop surface, and the first engagement portion is formed at a first stop-rotation ratchet disposed opposite to the first ratchet.

5. The tool attachment device of claim 4, wherein the driving wheel comprises a drum formed with an accommodating cavity and a wheel disk fixedly connected to the drum, the transmission is placed in the accommodating cavity, the drum comprises a first connection portion, the transmission is formed with a second connection portion, the drum is connected to the transmission through the first connection portion and the second connection portion, the nail feeding structures are uniformly distributed on the wheel disk along a circumferential direction of the wheel disk, and the shell assembly further comprises a second engagement portion formed with a second stop-rotation ratchet disposed opposite to the second ratchet.

6. The tool attachment device of claim 4, wherein the driving wheel is fixedly connected to the central shaft, the central shaft is rotatably connected to the first ratchet wheel in a synchronous manner, the driving wheel comprises a second engagement portion, and the second engagement portion is formed with a second stop-rotation ratchet disposed opposite to the second ratchet.

7. The tool attachment device of claim 2, wherein a side of the rotatable disk is formed with a mounting groove, the first engagement portion constitutes a side wall of the mounting groove, and the elastic element is disposed in the mounting groove and unidirectionally rotatable in the mounting groove.

8. The tool attachment device of claim 7, wherein the transmission comprises a central shaft, the central shaft is fixedly connected to the elastic element, the elastic element is formed with at least two extension arms, the first engagement portion is configured to limit the at least two extension arms to rotate unidirectionally in the mounting groove.

9. The tool attachment device of claim 1, wherein the shell assembly comprises a main shell, a nail feeding shell capable of moving back and forth relative to the main shell in a nail feeding direction, and a guide structure formed in the nail feeding shell, and the tool attachment device further comprises an extension rod configured to pass through the guide structure to drive a screw to rotate.

10. The tool attachment device of claim 1, wherein a number of driving wheels is one.

11. The tool attachment device of claim 1, further comprising a mounting device, wherein the mounting device is disposed in the shell assembly and configured to be connected to a front end of the power tool and the mounting device comprises a stop-rotation connection portion connected to the power tool in a stop-rotation manner, a sliding groove disposed in the mounting device and provided with an opening on a surface of the mounting device, and a positioning device, the positioning device comprises an elastic piece and a stop piece disposed in the sliding groove and abutting against the elastic piece, the shell assembly comprises a plurality of limiting grooves, and the stop piece is capable of being limited between the sliding groove and the limiting groove by the elastic piece.

12. The tool attachment device of claim 11, further comprising a connection hole disposed in the mounting device and penetrating through the mounting device, a roll ball disposed in the connection hole, and a switching device having a locking state configured to limit the roll ball in a first position where the roll ball is capable of being connected to a power tool system and the power tool and an unlocking state configured to allow the roll ball to move between a second position and the first position within the connection hole.

13. A power tool system, comprising:

a power tool comprising an output portion rotatable about a first axis;

a tool attachment device, wherein the tool attachment device comprises:

a shell assembly, wherein a side of the shell assembly is formed with a hole passage;

a rocker partially placed in the hole passage and rotatable in the hole passage;

a connector connected to the rocker and rotatable synchronously with the rocker;

a driving wheel, wherein nail feeding structures are formed on the driving wheel along a circumferential direction of the driving wheel, and a number of driving wheels is one; and a transmission connected to the driving wheel and the connector and configured to drive the driving wheel to rotate unidirectionally, wherein the transmission is disposed between the connector and the driving wheel, and the transmission comprises a first ratchet wheel, a second ratchet wheel, and an elastic element, the elastic element is disposed between the first ratchet wheel and the second ratchet wheel, and the elastic element is a device that can store energy through compression.

14. The power tool system of claim 13, wherein the tool attachment device further comprises a mounting device disposed in the shell assembly and configured to be connected to a front end of the power tool, a limiting ring disposed on a front end of the mounting device along a circumferential direction, and a stop piece abutting against the limiting ring, the front end of the power tool is formed with a fitting portion connected to the tool attachment device, the mounting device comprises at least two mounting holes, and the stop piece is placed in the at least two mounting holes and biased by the limiting ring such that the stop piece clamps the fitting portion to enable the power tool to be rotatable relative to the tool attachment device and fixed to at least two positions.

15. The power tool system of claim 14, wherein an inner periphery of the mounting device is provided with a groove, the front end of the power tool is formed with a convex rib, and the convex rib is configured to be placed into the groove along the first axis.

16. The power tool system of claim 15, wherein the limiting ring is an elastic piece, the limiting ring is configured to bias the stop piece to a locking position such that the stop piece prevents rotation of the convex rib in a certain direction relative to the tool attachment device in response to the power tool being connected to the mounting device, the stop piece is a ball, and the convex rib is configured to press the stop piece to disengage the stop piece from the locking position.

17. The power tool system of claim 13, wherein the connector comprises a rotatable disk and a first engagement portion disposed on a side of the rotatable disk and the first engagement portion is connected to the transmission in a unidirectional stop-rotation manner.

18. The power tool system of claim 17, wherein the transmission comprises a central shaft, the first ratchet wheel comprises a first ratchet and a first shaft hole, the second ratchet wheel comprises a second ratchet and a second shaft hole, and the central shaft passes through the first shaft hole and/or the second shaft hole.

19. The power tool system of claim 13, wherein the tool attachment device further comprises a mounting device disposed in the shell assembly and configured to be connected to a front end of the power tool and a dust exhaust device that prevents dust generated due to operation of the power tool system from entering between the mounting device and the shell assembly, the mounting device is capable of rotating to at least two positions about the first axis relative to the shell assembly, and the dust exhaust device is disposed between the mounting device and the nail feeding structure.

* * * * *